US010118636B2

(12) United States Patent
Sakaguchi et al.

(10) Patent No.: US 10,118,636 B2
(45) Date of Patent: *Nov. 6, 2018

(54) ELECTRIC POWER STEERING APPARATUS

(71) Applicant: NSK LTD., Tokyo (JP)

(72) Inventors: Toru Sakaguchi, Maebashi (JP); Shoya Maruyama, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/520,162

(22) PCT Filed: Dec. 24, 2015

(86) PCT No.: PCT/JP2015/085951
§ 371 (c)(1),
(2) Date: Apr. 19, 2017

(87) PCT Pub. No.: WO2016/104568
PCT Pub. Date: Jun. 30, 2016

(65) Prior Publication Data
US 2017/0327144 A1 Nov. 16, 2017

(30) Foreign Application Priority Data

Dec. 25, 2014 (JP) .................................. 2014-262244
Aug. 24, 2015 (JP) .................................. 2015-164791
Sep. 16, 2015 (JP) .................................. 2015-183267

(51) Int. Cl.
*B62D 5/04* (2006.01)
*G05B 13/04* (2006.01)
(Continued)

(52) U.S. Cl.
CPC ........ *B62D 5/0463* (2013.01); *B62D 5/0469* (2013.01); *B62D 6/00* (2013.01); *B62D 1/166* (2013.01); *G05B 13/04* (2013.01)

(58) Field of Classification Search
CPC ........ B62D 5/0463; B62D 6/00; B62D 1/166; B62D 5/04; B62D 5/0469; G05B 13/04
See application file for complete search history.

(56) References Cited

U.S. PATENT DOCUMENTS 5,473,539 A * 12/1995 Shimizu ............... B62D 5/0463
180/446
6,408,235 B1 * 6/2002 Tanke, II ............. B62D 5/0469
180/443

(Continued)

FOREIGN PATENT DOCUMENTS

JP   06-004417 A   1/1994
JP   4115156 B2   7/2008
(Continued)

OTHER PUBLICATIONS

International Search Report for PCT/JP2015/085951 dated Mar. 29, 2016.

*Primary Examiner* — Stephen Holwerda
(74) *Attorney, Agent, or Firm* — Sughrue Mion, PLLC

(57) ABSTRACT

A high-performance electric power steering apparatus that includes a control system based on a physical model, includes a model following control that an output (a distance to a rack end) of a controlled object follows-up to a reference model, eliminates or reduces the occurrences of a noisy sound and a shock force at an end hitting without giving any uncomfortable steering feeling to a driver, and reduces the end hitting. The electric power steering apparatus calculates a current command value based on at least a steering torque and performs an assist-control of a steering system by driving a motor based on the current command value, including: a configuration of a model following control including a viscoelastic model as a reference model within a predetermined angle at front of a rack end so as to suppress a rack end hitting.

20 Claims, 28 Drawing Sheets

(51) Int. Cl.
*B62D 6/00* (2006.01)
*B62D 1/16* (2006.01)

(56) References Cited

U.S. PATENT DOCUMENTS

| | | | | |
|---|---|---|---|---|
| 2005/0082106 | A1* | 4/2005 | Husain | B62D 5/005 |
| | | | | 180/402 |
| 2005/0182541 | A1* | 8/2005 | Tamaizumi | B62D 5/046 |
| | | | | 701/41 |
| 2008/0133066 | A1 | 6/2008 | Takenaka | |
| 2008/0281490 | A1* | 11/2008 | Wittig | B62D 5/0457 |
| | | | | 701/41 |
| 2008/0306655 | A1* | 12/2008 | Ukai | B62D 5/046 |
| | | | | 701/42 |
| 2009/0056474 | A1* | 3/2009 | Watanabe | B62D 5/0463 |
| | | | | 73/862.193 |
| 2009/0112406 | A1* | 4/2009 | Fujii | B62D 5/0463 |
| | | | | 701/42 |
| 2015/0191200 | A1* | 7/2015 | Tsubaki | B62D 15/0285 |
| | | | | 701/42 |

FOREIGN PATENT DOCUMENTS

| | | |
|---|---|---|
| JP | 2008-290525 A | 12/2008 |
| WO | 2006/013922 A1 | 2/2006 |
| WO | 2014/195625 A2 | 12/2014 |

* cited by examiner

PRIOR ART

FIRST EXAMPLE

SECOND EXAMPLE

THIRD EXAMPLE

FOURTH EXAMPLE

FIG.26 FIFTH EXAMPLE

ELECTRIC POWER STEERING APPARATUS

CROSS REFERENCE TO RELATED APPLICATIONS

This application is a National Stage of International Application No. PCT/JP2015/085951 filed Dec. 24, 2015, claiming priority based on Japanese Patent Application Nos. 2014-262244 filed Dec. 25, 2014, 2015-164791 filed Aug. 24, 2015 and 2015-183267 filed Sep. 16, 2015, the contents of all of which are incorporated herein by reference in their entirety.

TECHNICAL FIELD

The present invention relates to an electric power steering apparatus that calculates a current command value based on at least a steering torque, drives a motor by using the current command value, and provides a steering system of a vehicle with an assist torque, and in particular to the electric power steering apparatus that sets a viscoelastic model as a reference (normative) model, decreases the assist torque by reducing the current command value near a rack end, decreases a striking energy by attenuating a force at an end hitting time, suppresses a hitting sound (a noisy sound) that a driver feels uncomfortable, and improves a steering feeling.

More particularly, the present invention relates to a high-performance electric power steering apparatus that can appropriately deal with various kinds of road surface conditions by changing model parameters of the reference model and control parameters of a control system (a feed-back control section) based on a rack axial force, a rack displacement and a steering state (steer-forward/steer-backward), by suppressing the shock by means of an input limitation.

BACKGROUND ART

An electric power steering apparatus (EPS) which provides a steering system of a vehicle with an assist torque by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus performs a feed-back control of a motor current. The feed-back control adjusts a voltage supplied to the motor so that a difference between a current command value and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Th of the steering wheel 1, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value.

A controller area network (CAN) 40 to send/receive various information and signals on the vehicle is connected to the control unit 30, and it is also possible to receive the vehicle speed Vel from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a CPU (including an MPU and an MCU), and general functions performed by programs within the CPU are, for example, shown in FIG. 2.

Functions and operations of the control unit 30 will be described with reference to FIG. 2. The steering torque Th from the torque sensor 10 and the vehicle speed Vel from the vehicle speed sensor 12 are inputted into a torque control section 31 to calculate a current command value Iref1, and the calculated current command value Iref1 is inputted into a subtracting section 32B, where a detected motor current value Im is subtracted from the current command value Iref1. A deviation I (=Iref1−Im) which is the subtracted result in the subtracting section 32B is controlled in the current control section 35 such as a proportional-integral (PI) control and so on. The voltage control value Vref obtained by the current control is inputted into a PWM-control section 36 which calculates duty command values, and PWM-drives the motor 20 through an inverter circuit 37 by means of a PWM signal. The motor current value Im of the motor 20 is detected by a motor current detector 38, and is inputted and fed back to the subtracting section 32B. Further, a rotational angle sensor 21 such as a resolver is connected to the motor 20 and a steering angle θ is detected and outputted.

In such the electric power steering apparatus, when a large assist torque from the motor is applied to the steering system near the maximum steering angle (the rack end) thereof, a strong impact (a shock) occurs at a time when the steering system reaches at the maximum steering angle, and the driver may feel uncomfortable because of generating the hitting noise (noisy sound) due to the shock.

The electric power steering apparatus that includes a steering angle judging means for judging whether the steering angle of the steering system reaches at a front by a predetermined value from the maximum steering angle and a correcting means for correcting which decreases the assist torque by reducing the power supplied to the motor when the steering angle reaches at a front by a predetermined value from the maximum steering angle, is disclosed in Japanese Examined Patent Application Publication No. H6-4417 B2 (Patent Document 1).

Further, the electric power steering apparatus disclosed in Japanese Patent No. 4115156 B2 (Patent Document 2) is that: the electric power steering apparatus that judges whether an adjustment mechanism becomes near an end position or not, controls a driving means so as to decrease a steering assist when the adjustment mechanism reaches at near the end position, and evaluates an adjustment speed determined by a position sensor in order to determine the speed when the adjustment mechanism approaches to the end position.

THE LIST OF PRIOR ART DOCUMENTS

Patent Documents

Patent Document 1: Japanese Examined Patent Application Publication No. H6-4417 B2
Patent Document 2: Japanese Patent No. 4115156 B2

SUMMARY OF THE INVENTION

Problems to be Solved by the Invention

However, since the electric power steering apparatus disclosed in Patent Document 1 decreases the power when the steering angle reaches at a front by a predetermined value from the maximum steering angle and the steering velocity or the like is not entirely considered, it is impossible to perform a fine current-decreasing control. Patent Document 1 does not disclose the characteristics to decrease the assist torque of the motor and a concrete configuration is not shown.

Further, although the electric power steering apparatus disclosed in Patent Document 2 decreases an assist amount toward the end position, it adjusts the decreasing speed of the assist amount in response to a velocity approaching to the end position and sufficiently falls down the speed at the end position. However, Patent Document 2 shows only to vary the characteristic changing in response to the speed and is not subjected based on a physical model. Furthermore, since Patent Document 2 does not perform the feed-back control, there is a fear that the characteristic or the result vary depending on a road surface condition (a load state).

The present invention has been developed in view of the above-described circumstances, and it is an object of the present invention is to provide a high-performance electric power steering apparatus that constitutes a control system based on a physical model, constitutes a model-following control that an output (a distance to a rack end) of a controlled object follows-up to an output of a reference model, eliminates or reduces the occurrences of a noisy sound and a shock force at an end hitting without giving any uncomfortable steering feeling to a driver. To provide an electric power steering apparatus that eliminates or reduces the shock force by changing model parameters and control parameters for a feed-back (FB) control section based on a rack axial force, a rack displacement and a steering state (steer-forward/steer-backward), by suppressing the shock by means of an input limitation, is also another object of the present invention.

Means for Solving the Problems

The present invention relates to an electric power steering apparatus that calculates a current command value based on at least a steering torque and performs an assist-control of a steering system by driving a motor based on said current command value, the above-described object of the present invention is achieved by comprising: a configuration of a model following control including a viscoelastic model as a reference model within a predetermined angle at front of a rack end so as to suppress a rack end hitting.

Further, the present invention relates to an electric power steering apparatus that calculates a first current command value based on at least a steering torque and performs an assist-control of a steering system by driving a motor based on said first current command value, the above-described object of the present invention is achieved by comprising: a first converting section to convert said first current command value to a rack axial force or a first column axial torque; a rack position converting section to converting a rotational angle of said motor to a judgment rack position; a rack end approach judging section to judge that a steering approaches to a rack end based on said judgment rack position and to output a rack displacement and a switching signal; a viscoelastic model following control section to generate a rack axial force or a second column axial torque including a viscoelastic model as a reference model based on said rack axial force or said first column axial torque, said rack displacement and said switching signal; and a second converting section to convert said rack axial force or said second column axial torque to a second current command value; wherein said assist-control is performed by adding said second current command value to said first current command value so as to suppress a rack end hitting.

Furthermore, the present invention relates to an electric power steering apparatus that calculates a current command value based on at least a steering torque and performs an assist-control of a steering system by driving a motor based on said current command value, the above-described object of the present invention is achieved by comprising: a configuration of a model following control comprising a feed-back control section including a viscoelastic model as a reference model within a predetermined angle $x_0$ at front of a rack end; wherein said feed-back control section comprises a feed-back element to calculate a target rack displacement based on an input-side rack axial force f, and a control element section to output an output-side rack axial force ff based on a positional deviation between said target rack displacement and a rack displacement x; wherein said electric power steering apparatus further comprising: a correcting section to change parameter of at least one-side of said feed-back control section and said control element section and set corrected parameters; an axial force calculating section to calculate a rack axial force f4 based on said steering torque and said current command value; a limiter to limit a maximum value of said rack axial force f4 with a limiting value and to output said input-side rack axial force f; and a steering state judging section to judge a steering state; wherein said parameters of said feed-back control section are changed or switched in accordance with said rack displacement x and a judgment result of said steering state judging section.

Effects of the Invention

Because the electric power steering apparatus according to the present invention constitutes a control system based on the physical model, it is possible to easily see daylight for a constant design. Since the present electric power steering apparatus constitutes the model following control so that the output (the distance to the rack end) of the controlled object follows-up to output of the reference model, the present invention has an advantage effect that a robust (tough) end-hitting suppressing-control becomes possible against variations of the load state (external disturbance) and the controlled object.

Further, since the control parameters are changed within a predetermined angle, the driver does not feel a reaction-force uncomfortable due to the assist force change. Since it is possible to eliminate or reduce the shock force at a time reaching at the rack end and also to eliminate or reduce the shock force of the motor inertia due to a brake effect for the motor, it is also capable of protecting the intermediate shaft and gears.

Furthermore, according to the electric power steering apparatus of the present invention, because the model parameters of the reference model and the parameters of the control elements are variably set based on the rack axial force, the rack displacement and the steering state (steer-forward/steer-backward), the controllability of the apparatus is further improved. Furthermore, since the input of the rack axial force is limited, there are advantage effects that it is possible to eliminate or reduce the shock and to deal with the various road surface conditions.

MODE FOR CARRYING OUT THE INVENTION

Figure 1:
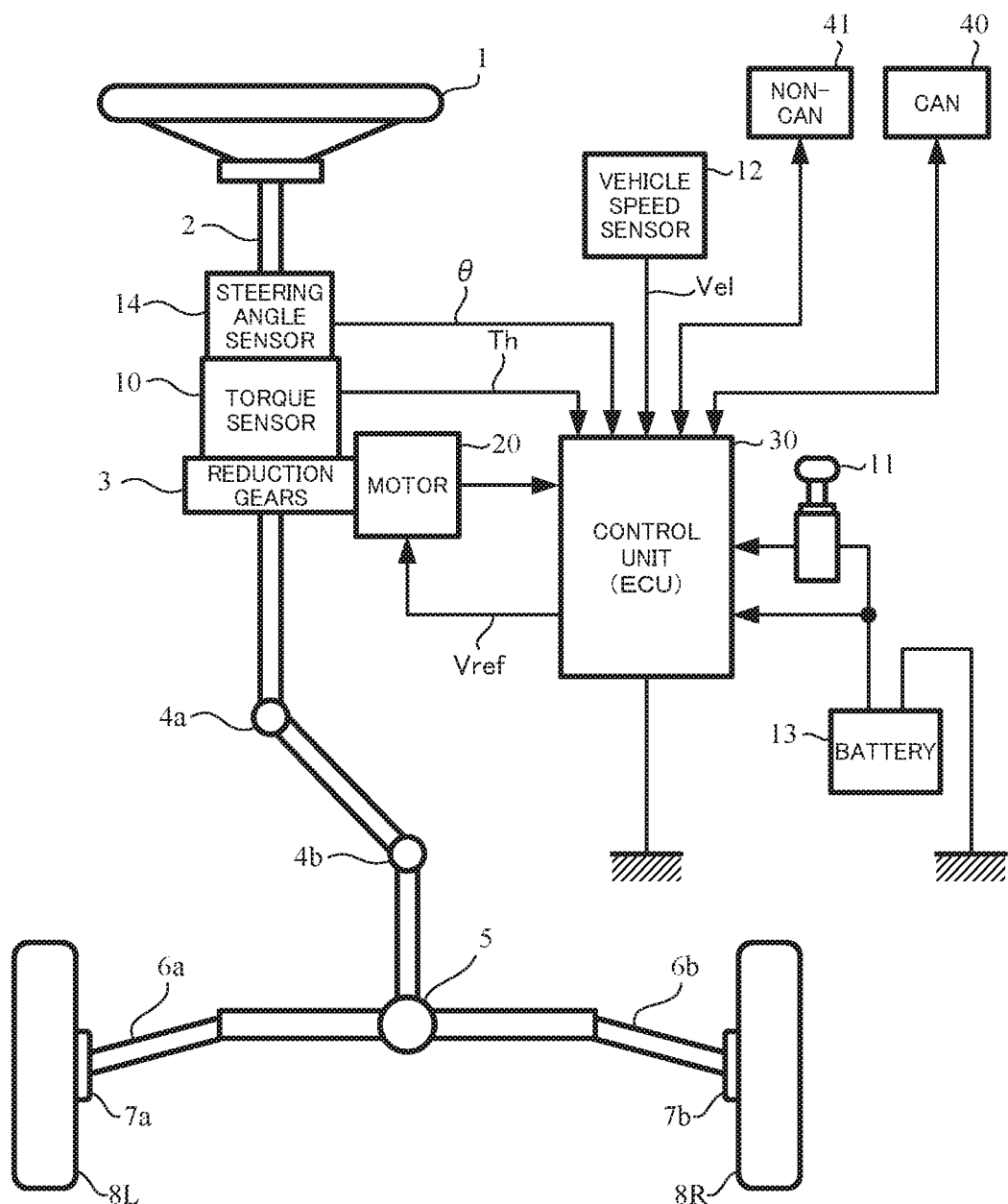
FIG. 1 is a configuration diagram illustrating a general outline of an electric power steering apparatus.

An electric power steering apparatus according to the present invention constitutes a control system based on a physical model near a rack end, sets a viscoelastic model (a spring constant and a viscous friction coefficient) as a reference (normative) model, constitutes a model following control so that an output (a distance to the rack end) of a controlled object follows-up to output of the reference model, eliminates or reduces an occurrence of a noisy sound at an end hitting time without giving a steering uncomfortable feeling to a driver, and eliminates or reduces the rack end hitting (including an attenuation of a shock force at a rack end hitting time).

The model following control comprises a viscoelastic model following control section. The viscoelastic model following control section comprises a feed-forward control section or a feed-back control section, or a combination thereof. The viscoelastic model following control section performs a normal assist-control out of a predetermined angle at a front of the rack end, and performs the model following control within the predetermined angle at the front of the rack end so as to suppress the shock force at the rack end hitting time.

The present invention changes the control parameters of the feed-back control section based on the rack displacement or a target rack displacement (a target steering angle) within a predetermined angle. For example, the control parameters are set so that the control gain of the feed-back control section is small at the neighborhood of a starting steering angle (a steering angle to start the model-following control) and becomes large as approaching at the rack end. Accordingly, the output of model following controller at the neighborhood of the starting steering angle becomes small and then a changing amount of the assist force of inner and outer regions in the predetermined angle also becomes small. Therefore, it is possible to suppress the uncomfortable reaction force feeling due to the assist force change to the driver. Since it is possible to enlarge the output of model following controller in the region near the rack end, it is possible to suppress the shock force at the time reaching at the rack end.

Further, the present invention changes the model parameters of the viscoelastic model of the model following control and the control parameters (control gains of the feed-back control section) with respect to the control elements within a predetermined angle, and limit the input to the model following controller. For example, a spring term of the viscoelastic model and the control gain are set small at a position near a start steering angle, and they are set larger as the rack position approaches at the rack end. When the rack position is within the predetermined angle, the smaller the rack axial force is, the larger the spring term and the control gain are set. Thus, the output of model following controller near the start steering angle can be small and the change amount of the assist amount within and out of the predetermined angle range becomes small. In this way, the driver does not feel uncomfortable for a reaction force due to the change of the assist amount. Since the control gain is set large and the output of model following controller is large at a region near the rack end, the shock force can be attenuated when the steering position reaches at the rack end.

Furthermore, the rack axial force within the predetermined angle range is varied depending on the road surface state (asphalt, a wet road surface, an ice surface, a snow surface, or the like). The rack axial force is small in a case (the ice surface or the snow surface) that a friction coefficient of the road surface is small, and it is large since the surface friction coefficient is large on the asphalt road. When the model parameters and the control parameters (the gains) are adequately set for the asphalt road, these parameters may not be appropriate for the ice surface, the snow surface or the like. In a case that the friction coefficient is small, a margin which can generate the large assist force toward the rack end is large, the steering angle greatly leads and a possibility to reach at the rack end progresses. Accordingly, it is desired the following system: the smaller the rack axial force at a time when the steering angle enters within the predetermined angle range is, the larger a spring constant of the viscoelastic model is and the higher the control gain is, and therefore the steering lead-angle is small. Consequently, the electric power steering apparatus according to the present invention comprises a correcting section being capable of enlarging the spring constant and the control gain as the rack axial force is small. In other embodiments, the shock is suppressed by limiting the maximum input of the rack axial force with a limiting value.

Still furthermore, by changing the model parameters and the control parameters in accordance with a steering state of a steer-forward and a steer-back, the present invention realizes to change a variation of the steering torque felt by the driver. For example, since the driver feels a sense to be returned if the steering torque suddenly becomes small at the steer-back maneuver, the comfort of the driver is impaired. It is capable of preventing the problem by setting the parameters so that the viscosity becomes large at the steer-back maneuver.

Hereinafter, embodiments of the present invention will be described with reference to the accompanying drawings.

Figure 2:
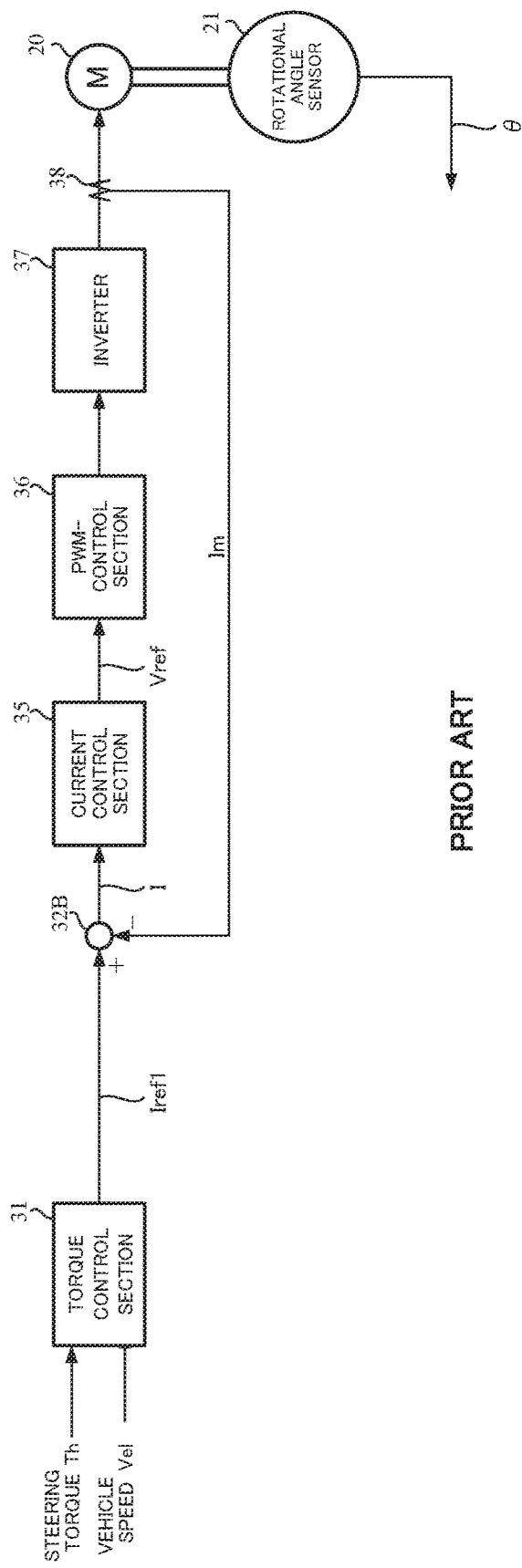
FIG. 2 is a block diagram showing a general configuration example of a control system of the electric power steering apparatus.
Figure 3:
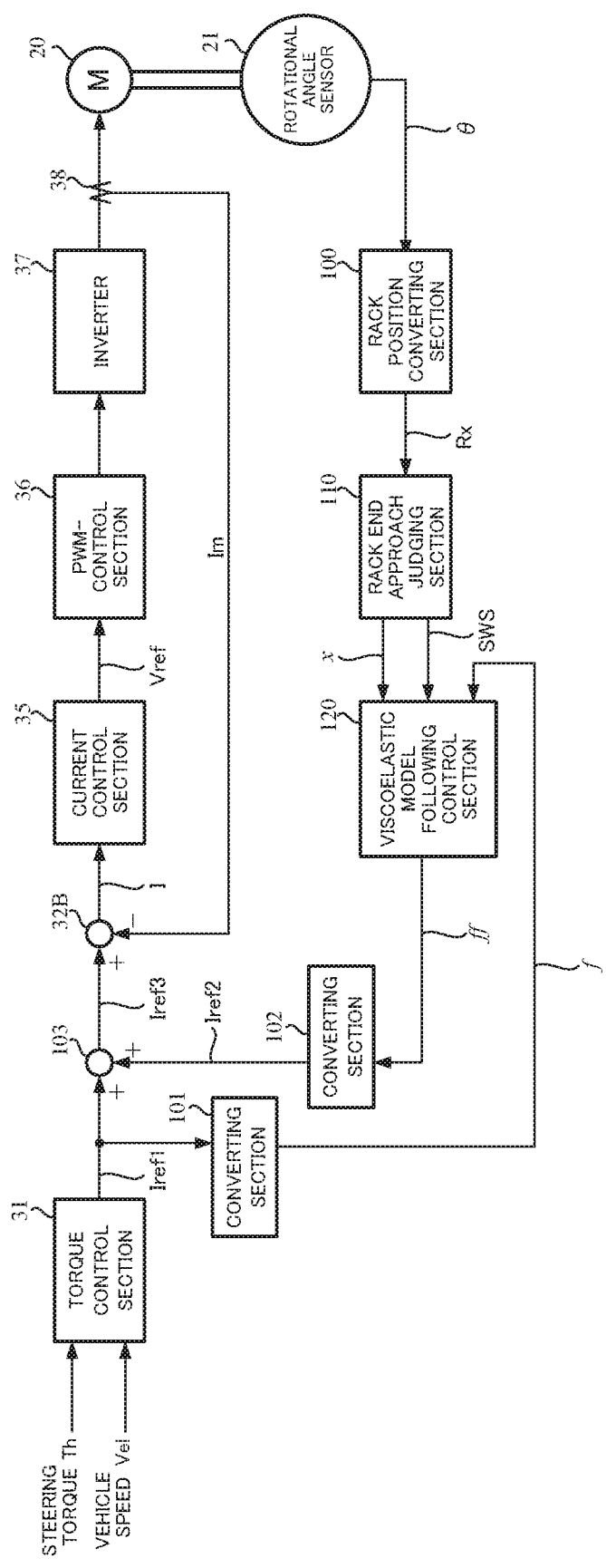
FIG. 3 is a block diagram showing a configuration example of the present invention.

FIG. 3 shows an example of the embodiment of the present invention corresponding to FIG. 2, a current command value Iref1 is converted to the rack axial force f in the converting section 101, and the rack axial force f is inputted into a viscoelastic model following control section 120. Although the rack axial force f is equivalent to a column shaft torque, the column shaft torque is conveniently considered as the rack axial force in the following description.

A conversion from the current command value Iref1 to the rack axial force f is performed based on the below Equation 1.

$$f = G1 \times Iref1 \qquad [\text{Equation 1}]$$

where, Kt is a torque constant [Nm/A], Gr is a reduction ratio, Cf is a stroke ratio [m/rev.], and $G1=Kt \times Gr \times (2\pi/Cf)$.

Figure 4:
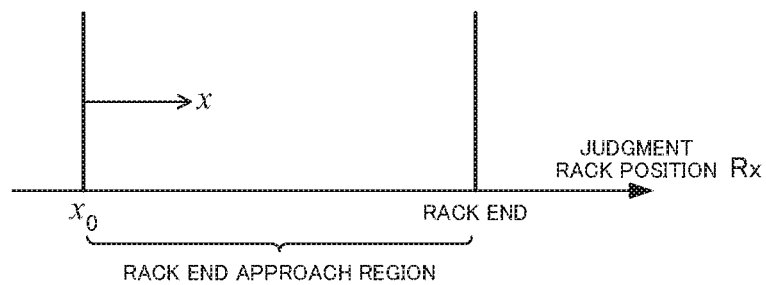
FIG. 4 is a diagram showing a characteristic example of a rack position converting section.

A rotational angle θ from a rotational angle sensor 21 is inputted into a rack position converting section 100 and is converted to a judgement rack position Rx. The judgement rack position Rx is inputted into a rack end approach judging section 110. As shown in FIG. 4, the rack end approach judging section 110 activates an end-hitting suppressing control function and outputs the rack displacement x and a switching signal SWS when the judgement rack position Rx is judged within a predetermined position $x_0$. The switching signal SWS and the rack displacement x are inputted into the viscoelastic model following control section 120 together with the rack axial force f. A rack axial force ff, which is control-calculated in the viscoelastic model following control section 120, is converted to the current command value Iref2 in a converting section 102. The current command value Iref2 is added to the current command value Iref1 in an adding section 103, and the added value is obtained as a current command value Iref3. The above described assist-control is performed based on the current command value Iref3.

As well, the predetermined position $x_0$ which sets a rack end approach region as shown in FIG. 4 enables to set an appropriate position. The predetermined position $x_0$ is not determined uniquely by using a rack ratio stroke, type of a vehicle, a feeling or the like, and normally sets at a front of the rack end whose range is 1 [mm] to 50 [mm].

The conversion from the rack axial force ff to the current command value Iref2 in the converting section 102 is performed based on the Equation 2.

$$Iref2 = ff/G1 \qquad [\text{Equation 2}]$$

Figure 5:
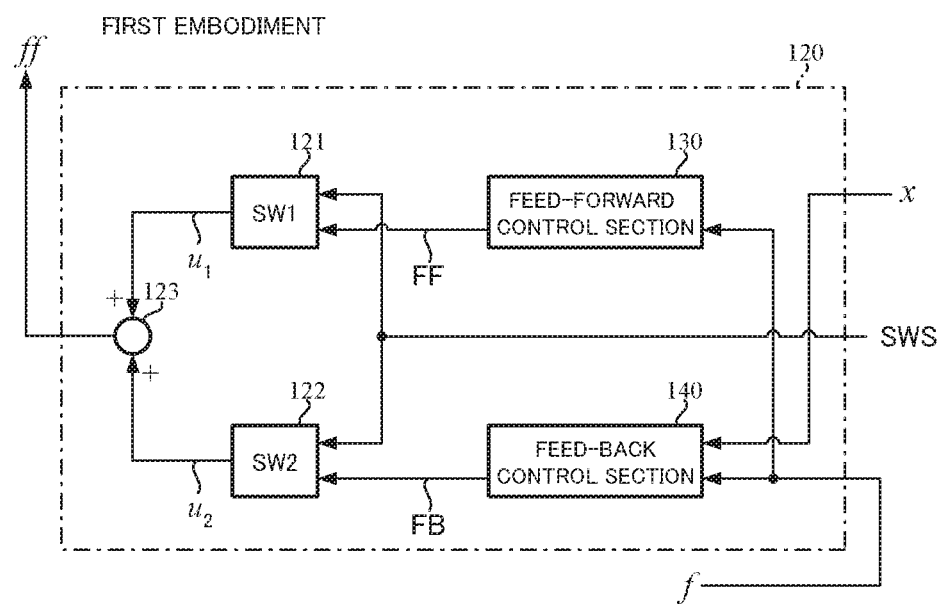
FIG. 5 is a block diagram showing a configuration example (the first embodiment) of a viscoelastic model following control section according to the present invention.
Figure 6:
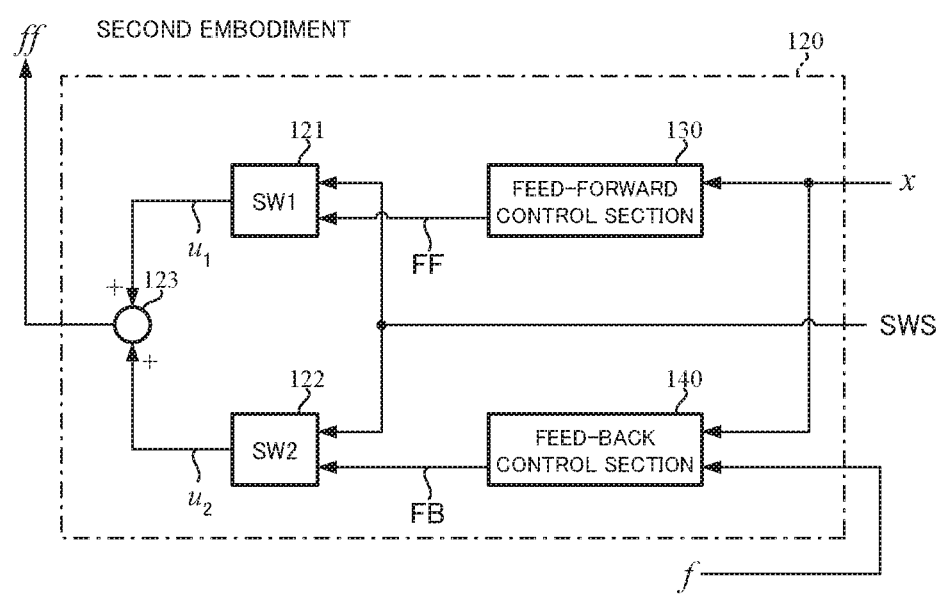
FIG. 6 is a block diagram showing a configuration example (the second embodiment) of a viscoelastic model following control section according to the present invention.

The detail of the viscoelastic model following control section 120 is shown in FIG. 5 or FIG. 6.

In the first embodiment shown in FIG. 5, the rack axial force f is inputted into a feed-forward control section 130 and a feed-back control section 140, and the rack displacement x is inputted into the feed-back control section 140. A rack axial force FF from the feed-forward control section 130 is inputted into a switching section 121, and a rack axial force FB from the feed-back control section 140 is inputted into a switching section 122. The switching sections 121 and 122 are switched-ON or -OFF by the switching signal SWS. When the switching sections 121 and 122 are switched-OFF by the switching signal SWS, each of outputs $u_1$ and $u_2$ is zero. When the switching sections 121 and 122 are switched-ON by the switching signal SWS, the rack axial force FF from the switching section 121 is outputted as a rack axial force $u_1$ and the rack axial force FB from the switching section 122 is outputted as a rack axial force $u_2$.

The rack axial forces $u_1$ and $u_2$ from the switching section 121 and 122 are added in the adding section 123, and a rack axial force of the added value ff is outputted from the viscoelastic model following control section 120. The rack axial force ff is converted to the current command value Iref2 in the converting section 102.

Further, in the second embodiment shown in FIG. 6, the rack displacement x is inputted into a feed-forward control section 130 and a feed-back control section 140, and the rack axial force f is inputted into the feed-back control section 140. The following process is the same as that of the first embodiment, the rack axial force FF from the feed-forward control section 130 is inputted into the switching section 121, and the rack axial force FB from the feed-back control section 140 is inputted into the switching section 122. The switching sections 121 and 122 are switched-ON or -OFF by the switching signal SWS. When the switching sections 121 and 122 are switched-OFF by the switching signal SWS, each of outputs $u_1$ and $u_2$ is zero. When the switching sections 121 and 122 are switched-ON by the switching signal SWS, the rack axial force FF from the switching section 121 is outputted as the rack axial force $u_1$ and the rack axial force FB from the switching section 122 is outputted as the rack axial force $u_2$. The rack axial forces $u_1$ and $u_2$ from the switching section 121 and 122 are added in the adding section 123, and a rack axial force of the added value ff is outputted from the viscoelastic model following control section 120. The rack axial force ff is converted to the current command value Iref2 in the converting section 102.

In the above structures, an overall operation example is described with reference to a flowchart of FIG. 7, and then an operation example of the viscoelastic model following control (the first and second embodiments) is described with reference to a flowchart of FIG. 8.

In a start stage, the switching sections 121 and 122 are switched-OFF by the switching signal SWS. When the operation is started, the torque control section 31 calculates the current command value Iref1 based on the steering torque Th and the vehicle speed Vel (Step S10), and the rack position converting section 100 converts the rotational angle θ from the rotational angle sensor 21 to the judgement rack position Rx (Step S11). The rack end approach judging section 110 judges whether the rack position approaches near the rack end based on the judgement rack position Rx or not (Step S12). In a case that the rack position is not near the rack end, the rack axial force ff from the viscoelastic model following control section 120 is not outputted and normal steering control based on the current command value Iref1 is performed (Step S13). This control is continued to the end (Step S14).

On the other hand, in a case that the rack position is near the rack end, the viscoelastic model following control is performed in the viscoelastic model following control section 120 (Step S20). As shown in FIG. 8, the rack end approach judging section 110 outputs the switching signal SWS (Step S201) and the rack displacement x (Step S202). The converting section 101 converts the current command value Iref1 to the rack axial force f by using the Equation 1 (Step S203). In the first embodiment shown in FIG. 5, the feed-forward control section 130 performs the feed-forward control based on the rack axial force f (Step S204), and the feed-back control section 140 performs the feed-back control based on the rack displacement x and the rack axial force f (Step S205). Further, in the second embodiment shown in FIG. 6, the feed-forward control section 130 performs the feed-forward control based on the rack displacement x (Step S204), and the feed-back control section 140 performs the feed-back control based on the rack displacement x and the rack axial force f (Step S205). In both cases, the order of the feed-forward control and the feed-back control may be alternated.

The switching signal SWS from the rack end approach judging section 110 is inputted into the switching sections 121 and 122, and the switching sections 121 and 122 are switched-ON (Step S206). When the switching sections 121 and 122 are switched-ON, the rack axial force FF from the feed-forward control section 130 is outputted as the rack axial force $u_1$ and the rack axial force FB from the feed-back control 140 is outputted as the rack axial force $u_2$. The rack axial forces $u_1$ and $u_2$ are added in the adding section 123 (Step S207), and then the rack axial force ff which is the added result is converted to the current converting value Iref2 in the converting section 102 by using the Equation 2 (Step S208).

The viscoelastic model following control section 120 according to the present invention is a control system based on the physical model near the rack end, constitutes the model following control which sets the viscoelastic model (a spring constant $k_0$ [N/m] and a viscous friction coefficient μ [N/(m/s)]) as the reference model (input: a force and output: the physical model which is described in the displacement), and attenuates the shock force at a time to hit to the rack end.

Figure 9:
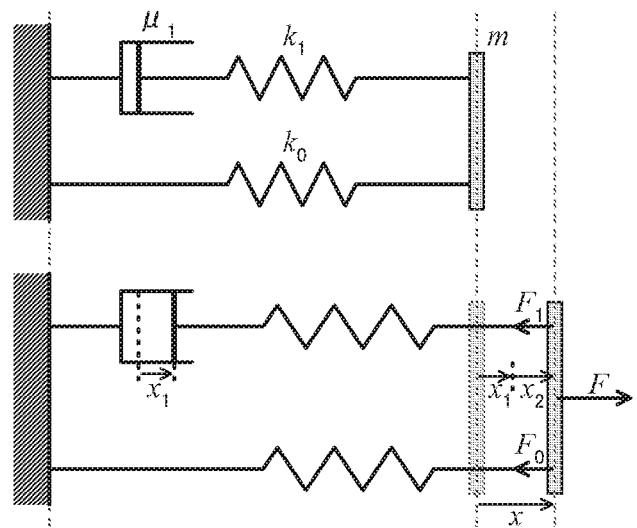
FIG. 9 is a schematic diagram of the viscoelastic model.

FIG. 9 is a schematic diagram near the rack end, and a relationship between mass m and forces $F_0$ and $F_1$ is represented by the Equation 3. The derivation of the equations of the viscoelastic model is described in, for example, "Elementary Mechanics for Elastic Membrane and Viscoelasticity" (Kenkichi OHBA) of "Engineering Sciences & Technology", Kansai University, official journal of a scientific society, Vol. 17 (2010).

$$F = m\ddot{x} + F_0 + F_1 \quad \text{[Equation 3]}$$

Assuming that spring constants $k_0$ and $k_1$ are defined for the rack displacements $x_1$ and $x_0$, respectively, and then the below Equations 4 to 6 are established.

$$x = x_1 + x_2 \quad \text{[Equation 4]}$$

$$F_0 = k_0 x \quad \text{[Equation 5]}$$

$$F_1 = \mu_1 \frac{dx_1}{dt} = k_1 x_2 \quad \text{[Equation 6]}$$

Therefore, the Equation 7 is obtained by substituting the Equations 4 to 6 into the Equation 3.

$$\begin{aligned} F &= m\ddot{x} + k_0 x + k_1 x_2 \\ &= m\ddot{x} + k_0 x + k_1(x - x_1) = m\ddot{x} + (k_0 + k_1)x - k_1 x_1 \end{aligned} \quad \text{[Equation 7]}$$

The Equation 8 is a result that the Equation 7 is differentiated, and then the Equation 9 is obtained by which the Equation 8 multiplies "$\mu_1/k_1$".

$$\dot{F} = m\dddot{x} + (k_0 + k_1)\dot{x} - k_1 \dot{x}_1 \quad \text{[Equation 8]}$$

$$\frac{\mu_1}{k_1}\dot{F} = \frac{\mu_1}{k_1} m\dddot{x} + \frac{\mu_1}{k_1}(k_0 + k_1)\dot{x} - \mu_1 \dot{x}_1 \quad \text{[Equation 9]}$$

Then, the Equation 10 is obtained by adding the Equations 7 and 9.

$$F + \frac{\mu_1}{k_1}\dot{F} = \quad \text{[Equation 10]}$$
$$m\ddot{x} + \frac{\mu_1}{k_1}m\dddot{x} + (k_0 + k_1)x - k_1 x_1 + \frac{\mu_1}{k_1}(k_0 + k_1)\dot{x} - \mu_1 \dot{x}_1$$

The Equation 11 is obtained by substituting the Equations 4 and 6 to the Equation 10.

$$F + \frac{\mu_1}{k_1}\dot{F} = m\ddot{x} + \frac{\mu_1}{k_1}m\dddot{x} + k_0 x + \mu_1(1 + k_0/k_1)\dot{x} \quad \text{[Equation 11]}$$

Here, $\mu_1/k_1 = \tau_e$, $k_0 = E_r$, and $\mu_1(1/k_0 + 1/k_1) = \tau_\delta$ are assumed, the Equation 11 can be expressed by the Equation 12. The Equation 13 is obtained by performing Laplace transform to the Equation 12.

$$F + \tau_e \dot{F} = \tau_e m \dddot{x} + m\ddot{x} + E_r(x + \tau_\delta \dot{x}) \quad \text{[Equation 12]}$$

$$(1 + \tau_e s)F(s) = \{\tau_e m s^3 + m s^2 + E_r(1 + \tau_\delta s)\}X(s) \quad \text{[Equation 13]}$$

The Equation 14 is obtained by summarizing the Equation 13 with "X(s)/F(s)".

$$\frac{X(s)}{F(s)} = \frac{1 + \tau_e s}{\tau_e m s^3 + m s^2 + E_r(1 + \tau_\delta s)} \quad \text{[Equation 14]}$$

The Equation 14 represents a third order physical model (transfer function) which indicates the characteristic from the input force f to the output displacement x. When the spring with the spring constant "$k_1 = \infty$" is used, "$\tau_e \to 0$" is satisfied. Because of "$\tau_\delta = \mu_1 \cdot 1/k_0$", the Equation 15 which is a quadratic function is derived.

$$\frac{X(s)}{F(s)} = \frac{1}{m \cdot s^2 + \mu_1 \cdot s + k_0} \quad \text{[Equation 15]}$$

The quadratic function represented by the Equation 15 as the reference model Gm is described in the present invention. That is, a function represented by the Equation 16 is the reference model Gm. Here, "$\mu_1$" is equal to $\mu$ ($\mu_1 = \mu$).

$$Gm = \frac{1}{m \cdot s^2 + \mu \cdot s + k_0} \quad \text{[Equation 16]}$$

Next, an actual plant 146 of the electric power steering apparatus is represented by "P" which is denoted by the Equation 17. Then, when the reference model following control according to the present invention is designed by a two-degree-of-freedom control system, the system is a configuration of FIG. 10 expressed as actual models Pn and Pd. A block 143 (Cd) shows a control element section. (refer to, for example, Hajime MAEDA and Toshiharu SUGIE, "System Control Theory for Advanced Control", published by Asakura Shoten in Japan)

$$P = \frac{Pn}{Pd} = \frac{N}{D} = \frac{1}{m \cdot s^2 + \eta \cdot s} \quad \text{[Equation 17]}$$

In order to express the actual plant P with a ratio of a stable rational function, N and D are represented by the below Equation 18. A numerator of "N" is that of "P", and a numerator of "D" is a denominator of "P". However, "$\alpha$" is determined such that a pole of "(s+$\alpha$)=0" can be selected arbitrary.

$$N = \frac{1}{(s+\alpha)^2}, D = \frac{m \cdot s^2 + \eta \cdot s}{(s+\alpha)^2} \quad \text{[Equation 18]}$$

When the reference model Gm is applied to the configuration of FIG. 10, it is necessary to set "1/F" as the below Equation 19 in order to satisfy "x/f=Gm". As well, the Equation 19 is derived from the Equations 16 and 18.

$$\frac{1}{F} = GmN^{-1} = \frac{(s+\alpha)^2}{m \cdot s^2 + \mu \cdot s + k_0} \quad \text{[Equation 19]}$$

A block N/F of the feed-back control section is represented by the below Equation 20.

$$\frac{N}{F} = \frac{1}{m \cdot s^2 + \mu \cdot s + k_0} \quad \text{[Equation 20]}$$

A block D/F of the feed-forward control section is represented by the below Equation 21.

$$\frac{D}{F} = \frac{m \cdot s^2 + \eta \cdot s}{m \cdot s^2 + \mu \cdot s + k_0} \quad \text{[Equation 21]}$$

In an example of the two-degree-of-freedom control system shown in FIG. 10, an input (the current command value corresponding to the rack axial force or the column axial torque) u to the actual plant P is represented by the below Equation 22.

$$u = u_1 + u_2 = \frac{D}{F}f + C_d e = \frac{D}{F}f + \left(\frac{N}{F}f - x\right)C_d \quad \text{[Equation 22]}$$

Further, an output (the rack displacement) x of the actual plant P is represented by the below Equation 23.

$$x = uP = P\frac{D}{F}f + P\left(\frac{N}{F}f - x\right)C_d = P\frac{D}{F}f + P\frac{N}{F}C_d f - PC_d x \quad \text{[Equation 23]}$$

When the Equation 23 is summarized and the term of the output x and the term of the left-hand side f are arranges to the right-hand side, the below Equation 24 is derived.

$$(1 + PC_d)x = P\left(\frac{D}{F} + \frac{N}{F}C_d\right)f \quad \text{[Equation 24]}$$

The below Equation 25 is obtained by expressing the Equation 24 as the transfer function of the output x against the input f. Here, the actual plant P is expressed as "P=Pn/Pd" after the third term.

$$\frac{x}{f} = \frac{P\left(\frac{D}{F} + \frac{N}{F}C_d\right)}{1 + PC_d} =$$ [Equation 25]

$$\frac{\frac{Pn}{Pd}\left(\frac{D}{F} + \frac{N}{F}C_d\right)}{1 + \frac{Pn}{Pd}C_d} = \frac{\frac{D}{F} + \frac{N}{F}C_d}{\frac{Pd}{Pn}C_d} = \frac{Pn}{F}\frac{NC_d + D}{PnC_d + Pd}$$

If the actual plant P is correctly expressed, it is possible to obtain the relations "Pn=N" and "Pd=D". The below Equation 26 is obtained from the Equation 25 since the characteristics of the output x against the input f is represented as "Pn/F (=N/F)".

$$\frac{x}{f} = \frac{Pn}{F}\frac{PnC_d + Pd}{PnC_d + Pd} = \frac{Pn}{F}$$ [Equation 26]

The characteristic of the output x against the input f (the reference model (the transfer function)) is considered as the Equation 27.

$$\frac{x}{f} = \frac{\omega_n^2}{s + 2\zeta\omega_n s + \omega_n^2}$$ [Equation 27]

It is possible to achieve the Equation 26 by putting "1/F" to the below Equation 28.

$$\frac{1}{f} = \frac{\omega_n^2}{s + 2\zeta\omega_n s + \omega_n^2}Pn^{-1}$$ [Equation 28]

Figure 10:
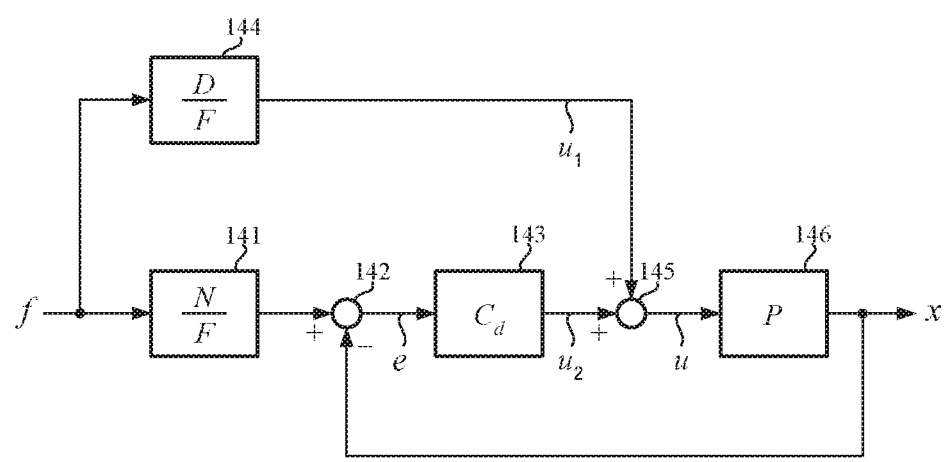
FIG. 10 is a block diagram showing detailed principle of the viscoelastic model following control section.
Figure 11A:
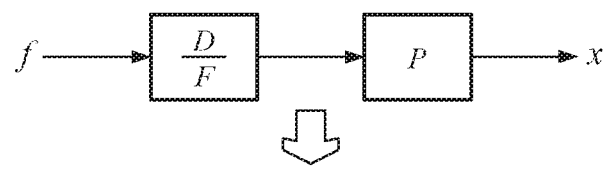
FIGS. 11A, 11B and 11C are block diagrams showing detailed principle of the viscoelastic model following control section.
Figure 11B:
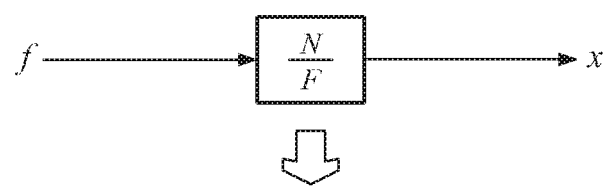
Figure 11C:
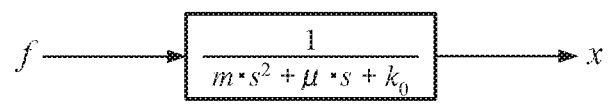

In FIG. 10, when the feed-forward control system is considered as a path of "a block 144→the actual plant P", this system is expressed as FIGS. 11A, 11B and 11C. Here, considering P as N/D (P=N/D), FIG. 11A can be expressed as FIG. 11B, and then FIG. 11C is obtained by using the Equation 20. Since an equation "f=(m·s$^2$+μ·s+k$_0$)x" is satisfied from FIG. 11C, the below Equation 29 is obtained by performing an inverse Laplace transform to the equation "f=(m·s$^2$+μ·s+k$_0$)x".

$$f = m\ddot{x} + \mu\dot{x} + k_0 x$$ [Equation 29]

Figure 12:
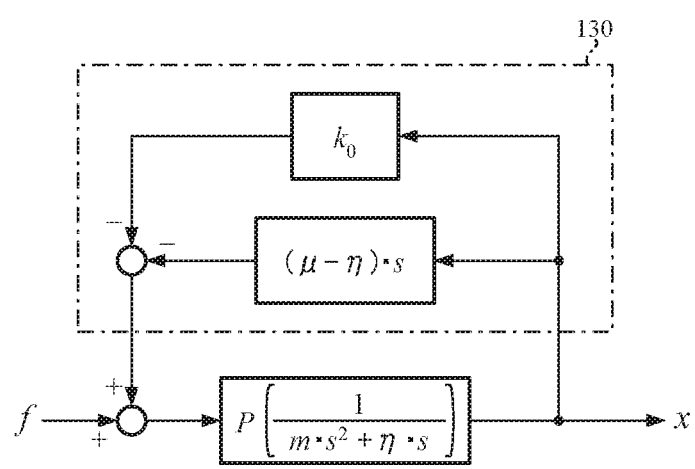
FIG. 12 is a block diagram showing detailed principle of the viscoelastic model following control section.

On the other hand, considering a transfer function block of the feed-forward control system as shown in FIG. 12, the below Equation 30 is satisfied in the input f and the output x.

$$\{f - (\mu - \eta)\cdot s\cdot x - k_0 x\}\frac{1}{m\cdot s^2 + \eta\cdot s} = x$$ [Equation 30]

The below Equation 31 is obtained by summarizing the Equation 30, and the below Equation 32 is derived by summarizing the Equation 31 with respect to the input f.

$$f - \{(\mu-\eta)\cdot s + k_0\}\cdot x = (m\cdot s^2 + \eta\cdot s)x$$ [Equation 31]

$$f = \{m\cdot s^2 + (\mu-\eta+\eta)\cdot s + k_0\}\cdot x$$ [Equation 32]

Figure 13:
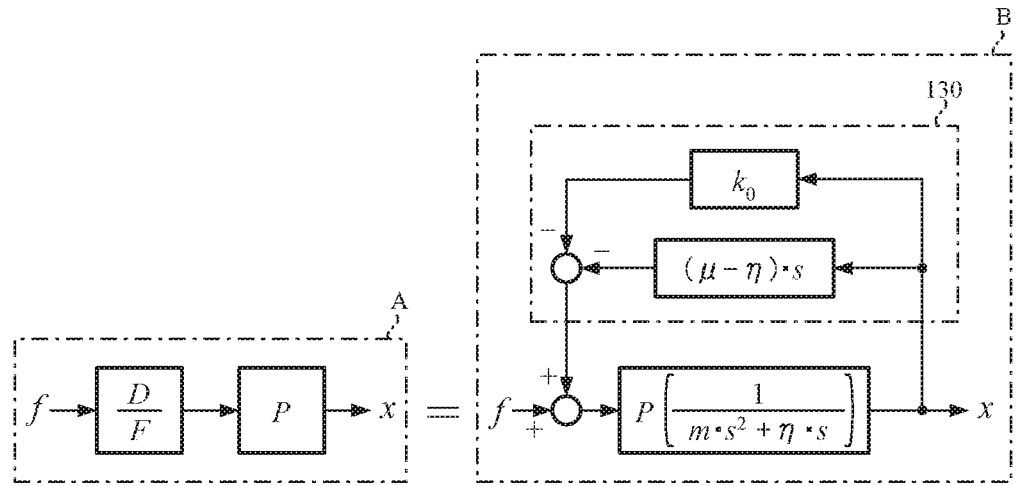
FIG. 13 is a block diagram showing detailed principle of the viscoelastic model following control section.

The above Equation 29 is obtained by performing the inverse Laplace transform on the Equation 32. Consequently, the feed-forward control sections A and B are equivalent each other as shown in FIG. 13.

Figure 14:
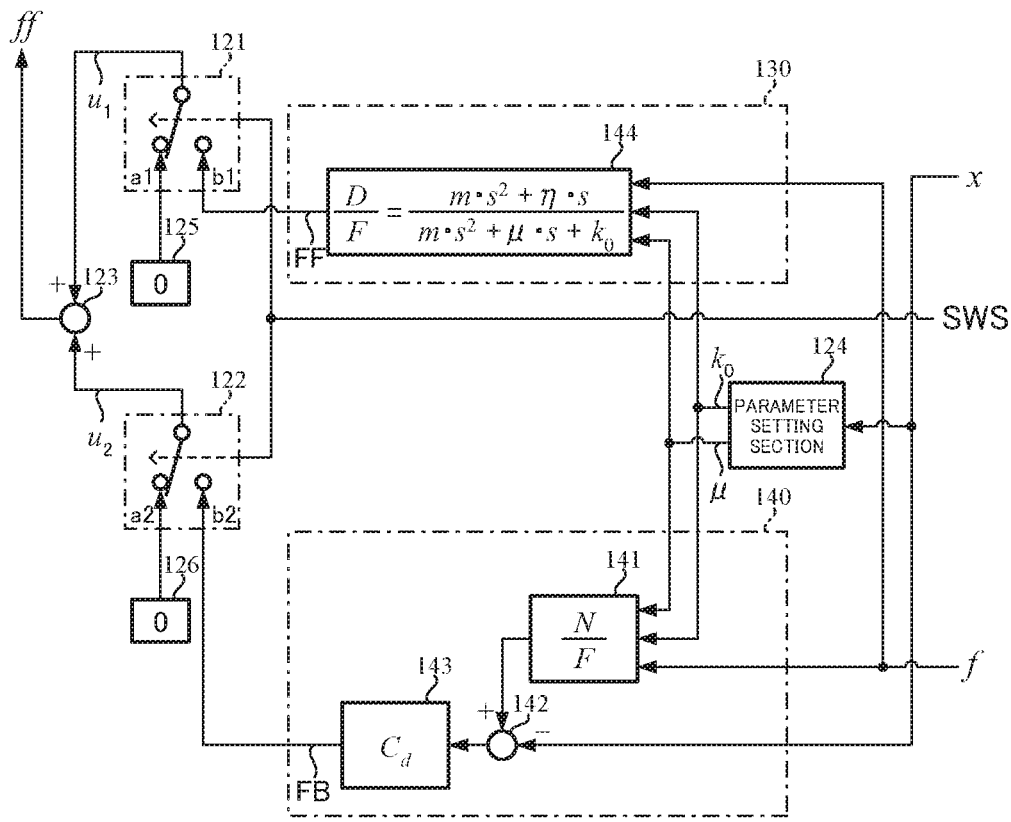
FIG. 14 is a block diagram showing a detailed configuration example (the first example) of a viscoelastic model following control section.

Considering the above-described premise, concrete configuration examples of the present invention will be described with reference to FIG. 14 and FIG. 15. The first example shown in FIG. 14 is corresponding to the first embodiment shown in FIG. 5, the rack axial force f is inputted into the feed-forward element 144 (D/F shown in the Equation 21) in the feed-forward control section 130 and the feed-back control section 140, and the rack displacement x is inputted into the feed-back control section 140. Further, the second example shown in FIG. 15 is corresponding to the second embodiment shown in FIG. 6, the rack displacement x is inputted into the spring constant term 131 and the viscous friction coefficient term 132 in the feed-forward control section 130, and the rack axial force f is inputted into the feed-back control section 140.

In the example 1 of FIG. 14, the rack axial force FF which is the output from the feed-forward element 144 is inputted into a contact point b1 of the switching section 121. Further, in the example 2 of FIG. 15, an output of the spring constant term 131 is subtracted from an output of the viscous friction coefficient term 132 at a subtracting section 133, the rack axial force FF of the subtracted result is inputted into a contact point b2 of the switching section 121. A fixed value "0" from the fixing section 125 is inputted into a contact point a1 of the switching section 121.

Figure 15:
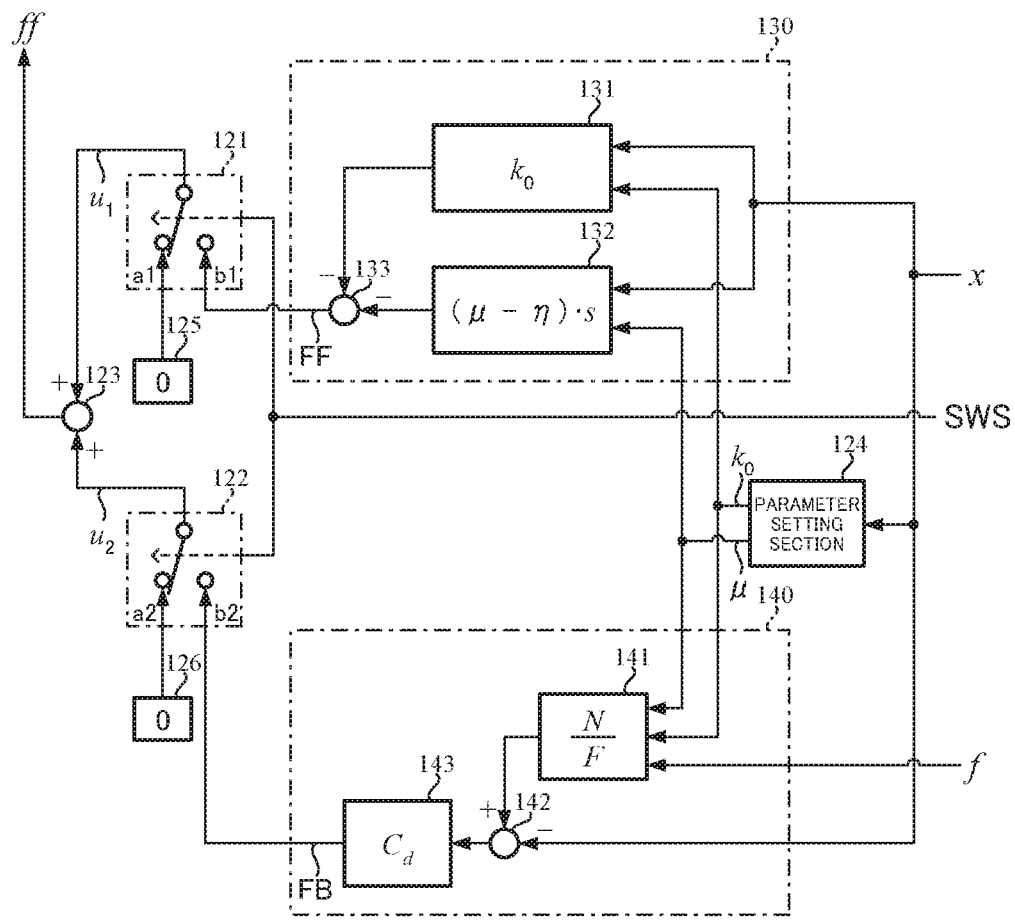
FIG. 15 is a block diagram showing a detailed configuration example (the second example) of a viscoelastic model following control section.

The feed-back control section 140 comprising the feed-back element (N/F) 141, the subtracting section 142 and the control element section 143 in any of the first example of FIG. 14 and the second example of FIG. 15, the rack axial force FB from the feed-back control section 140, that is, the output of the control element section 143 is inputted into the contact point b2 of the switching section 122. The fixed value "0" from the fixing section 126 is inputted into the contact point a2 of the switching section 122.

Figure 16A:
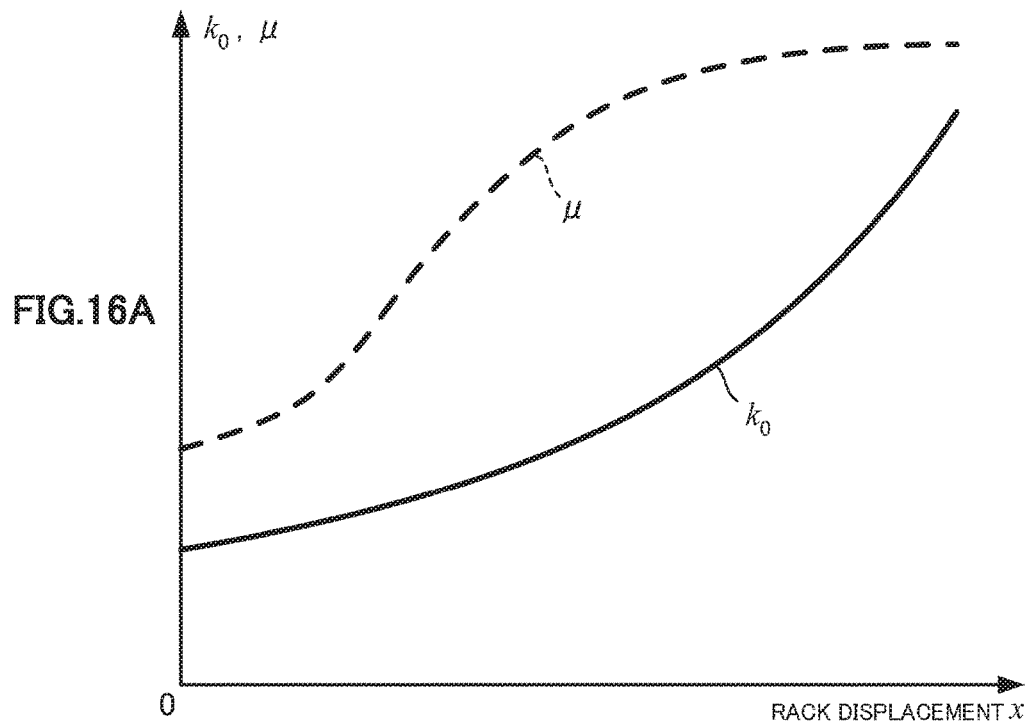
FIGS. 16A and 16B are diagrams showing an example of changing parameters of a reference model depending on a rack positon and the rack end neighborhood.

In the example 1 of FIG. 14, the rack axial force f is inputted into the feed-forward element 144 in the feed-forward control section 130 and the feed-back element (N/F) 141 in the feed-back control section 140. The rack displacement x is subtracting-inputted into the subtracting section 142 in the feed-back control section 140 and the parameter setting section 124. The parameter setting section 124 outputs the spring constant k$_0$ and the viscous friction coefficient μ of characteristics as shown in FIG. 16A for the rack displacement x, and the spring constant k$_0$ and the viscous friction coefficient μ are respectively inputted into the feed-forward element 144 in the feed-forward control section 130 and the feed-back element (N/F) 141 in the feed-back control section 140.

Figure 16B:
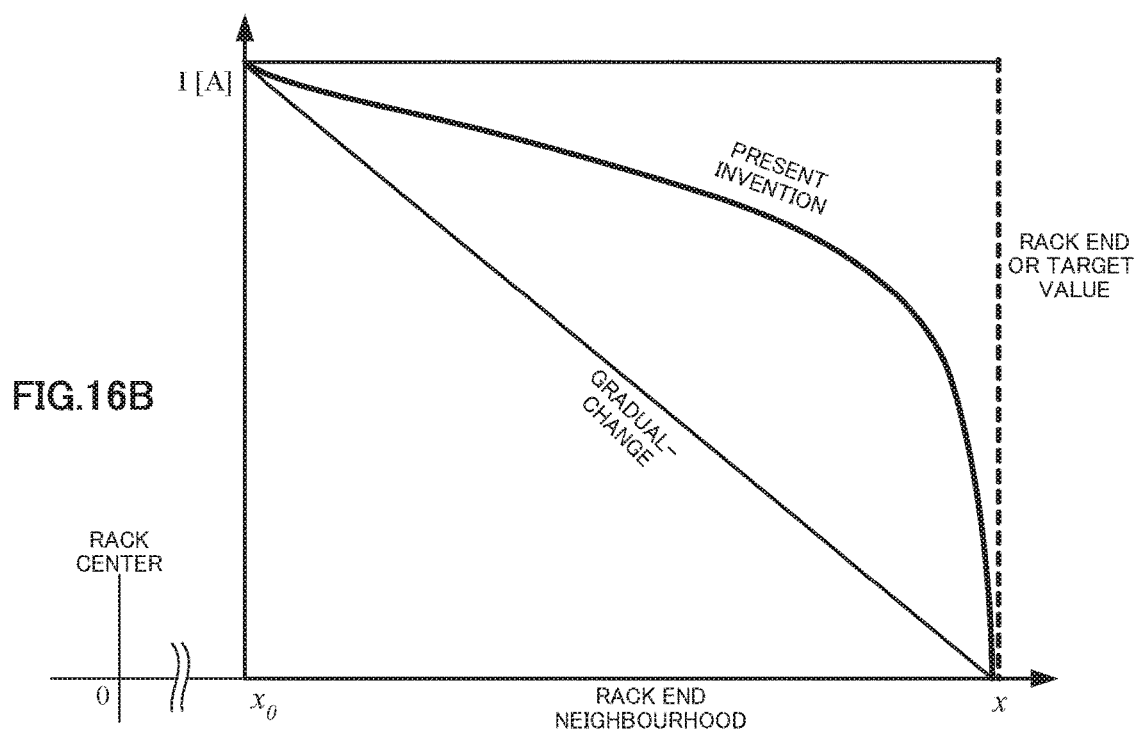

As well, FIG. 16B shows an image of a current I [A] (or the rack axial force f [N]) near of the end hitting in the actual control, the current is constant or increases to the rack end or the target value when the control is not acted. Consequently, there is no a viscoelastic effect. The present invention can suppress the shock force than a step input and has a sense (brake effect) at the end hitting due to a manual contact with the handle than the gradual-change.

In the example 2 of FIG. 15, the rack displacement x is inputted into the spring constant term 131 and the viscous friction coefficient term 132 and the subtracting section 142 in the feed-back control section 140 as well as the parameter setting section 124. The rack axial force f is inputted into the feed-back element (N/F) 141. The parameter setting section 124 outputs the spring constant k$_0$ and the viscous friction coefficient μ described-above for the rack displacement x, and the spring constant k$_0$ is inputted into the spring constant term 131 and the feed-back element (N/F) 141 and the viscous friction coefficient μ is inputted into the viscous friction coefficient term 132 and the feed-back element 141.

Further, the switching signal SWS is inputted into the switching sections 121 and 122 in any of the examples 1 and 2, the contact points of the switching sections 121 and 122 are normally connected to the contact points a1 and a2 respectively and are switched to the contact points b1 and b2.

Figure 17:
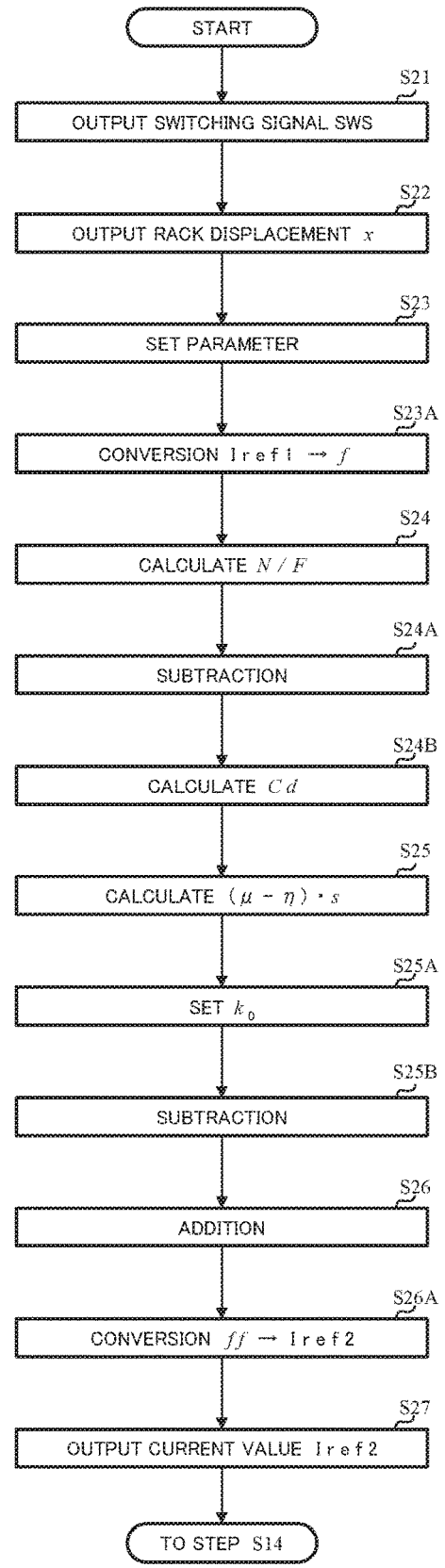
FIG. 17 is a flowchart showing an operation example of the viscoelastic model following control section.

In such the configuration, the operation example of the second example of FIG. 15 will be described with reference to flowcharts of FIG. 17.

The switching signal SWS is outputted from the rack end approach judging section 110 (Step S21), and the rack displacement x is outputted (Step S22). The rack displacement x is inputted into the spring constant term 131, the viscous friction coefficient term 132, the parameter setting section 124 and the subtracting section 142. The parameter setting section 124 sets the spring constant $k_0$ and the viscous friction coefficient μ obtained in accordance with the characteristics shown in FIG. 16A in the spring constant term 131, the viscous friction coefficient term 132 and the feed-back element (N/F) 141 (Step S23). Further, the converting section 101 converts the current command value Iref1 to the rack axial force f (Step S32A), and the rack axial force f is inputted into the feed-back element (N/F) 141 and then is N/F-calculated (Step S24). The N/F-calculated value is adding-inputted into the subtracting section 142 and then rack displacement x is subtracted (Step S24A), and the subtracted result is Cd-calculated at the control element section 143 (Step S24B). The calculated rack axial force FB is outputted from the control element section 143 and then is inputted into the contact point b2 of the switching section 122.

The viscous friction coefficient term 132 in the feed-forward control section 130 performs a calculation "(μ−η)·s" based on the viscous friction coefficient μ (Step S25), and sets the spring constant $k_0$ in the spring constant term 131 (Step S25A). The subtracting section 133 performs a subtraction of the output of "(μ−η)·s" element and the output of the spring constant $k_0$ element (Step S25B) and outputs the rack axial force FF as the subtraction result. The rack axial force FF is inputted into the contact point b1 of the switching section 121. The calculation order of the feed-forward control section 130 and the feed-back control section 140 is may be alternated.

The switching signal SWS from the rack end approach judging section 110 is inputted into the switching sections 121 and 122, and the contact points a1 and a2 of the switching sections 121 and 122 are respectively switched to the contact points b1 and b2. The rack axial forces $u_1$ and $u_2$ from the switching sections 121 and 122 are added at the adding section 123 (Step S26), and the rack axial force ff being the addition result is converted to the current command value Iref2 at the converting section 102 (Step S26A). The current command value Iref2 is inputted into the adding section 103 and then is added to the current command value Iref1 (Step S27) so that the steering control is performed and returns to the Step S14.

Figure 18:
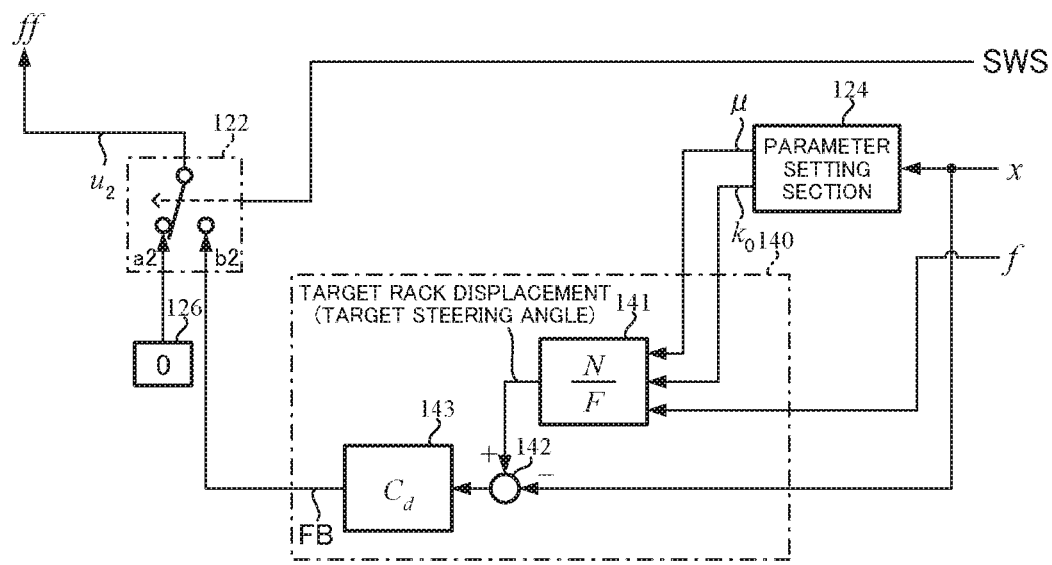
FIG. 18 is a block configuration diagram of another embodiment (the third embodiment) according to the present invention.
Figure 19:
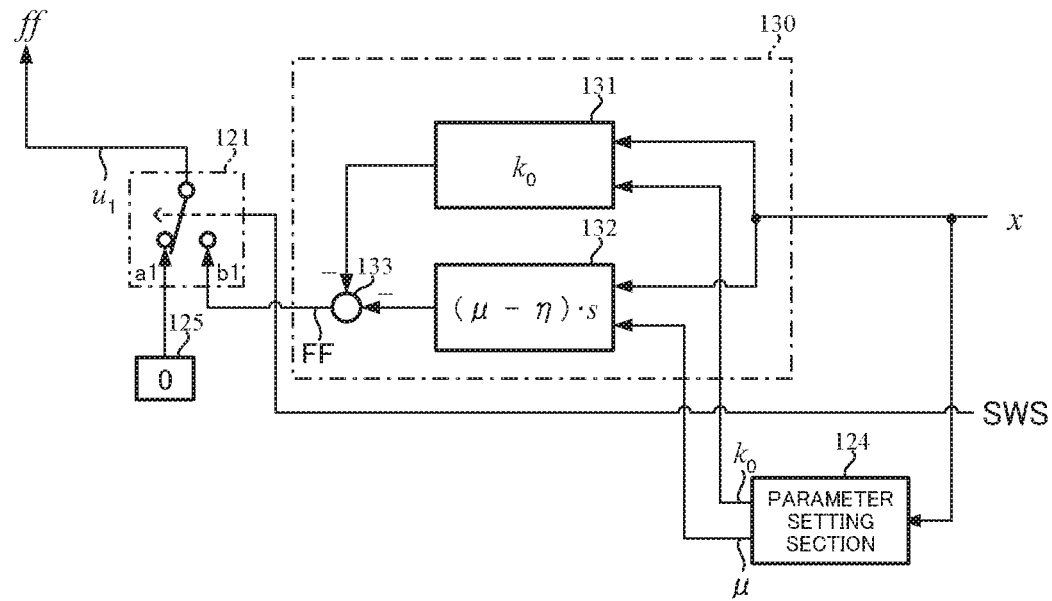
FIG. 19 is a block configuration diagram of another embodiment (the fourth embodiment) according to the present invention.

In the example 1 of FIG. 14 and the example 2 of FIG. 15, although the both control calculations of the feed-forward control section 130 and the feed-back control section 140 are performed, the configuration (the third embodiment) of only the feed-back control section 140 as shown in FIG. 18 or the configuration (the fourth embodiment) of only the feed-forward control section 130 as shown in FIG. 19 may be adopted.

Figure 20:
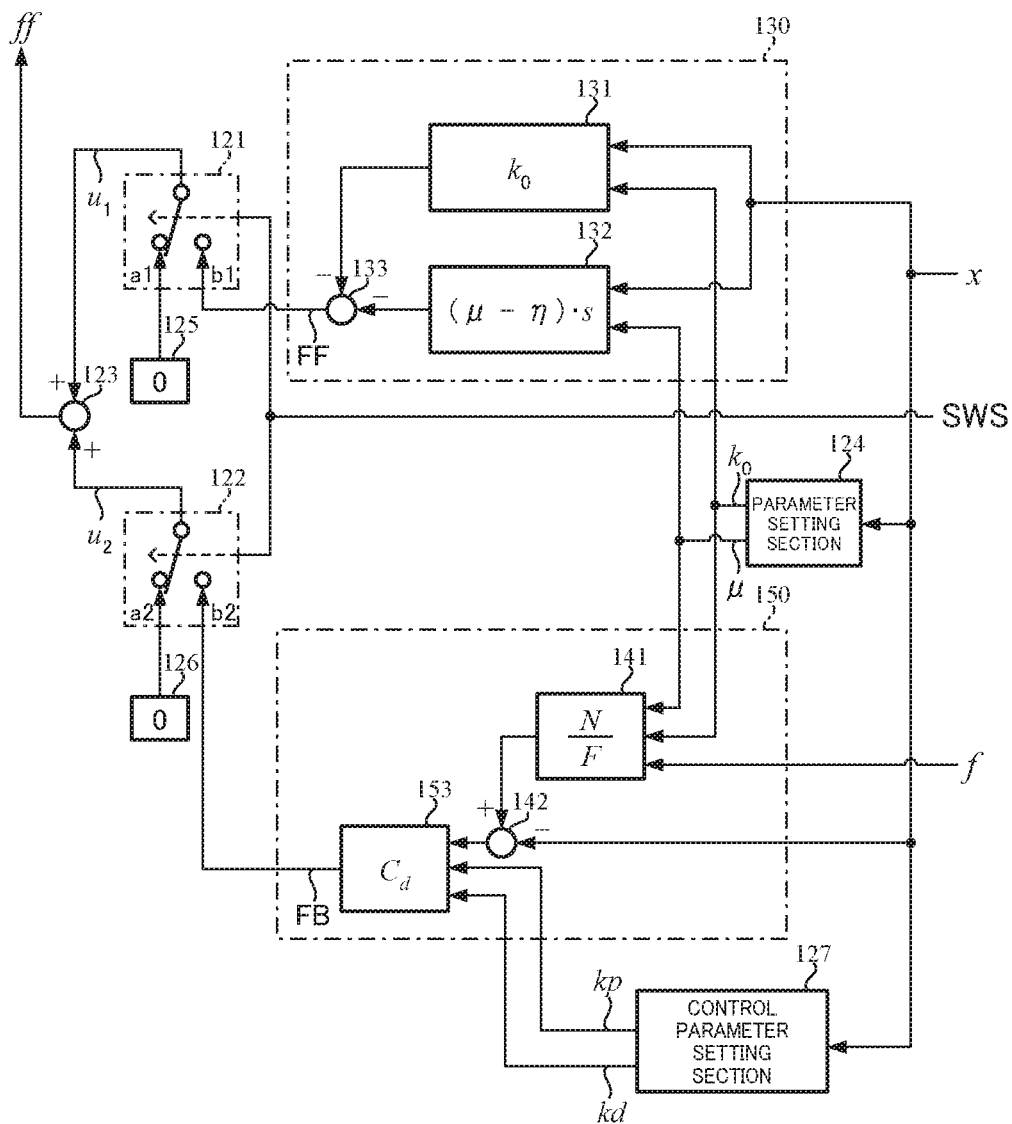
FIG. 20 is a block diagram showing a detailed configuration example (the third example) of a viscoelastic model following control section.

FIG. 20 shows the concrete configuration example of the viscoelastic model following control section according to the present invention corresponding to FIG. 15 as the third example, and the control parameter setting section 127 is added for the second example. Outputs from the control parameter setting section 127 are inputted into the control element section 153 in the feed-back control section 150. Another configurations are same with the fourth embodiment and therefore the explanations are omitted.

The control element section 153 is a configuration PD (Proportional+Differential) control and the transfer function is expressed as the following Equation 33.

$$Cd = kp + kd \cdot s \qquad \text{[Equation 33]}$$

where, kp is a proportional gain, kd is a differential gain and they are the control parameters of the feed-back control section 150.

Figure 21:
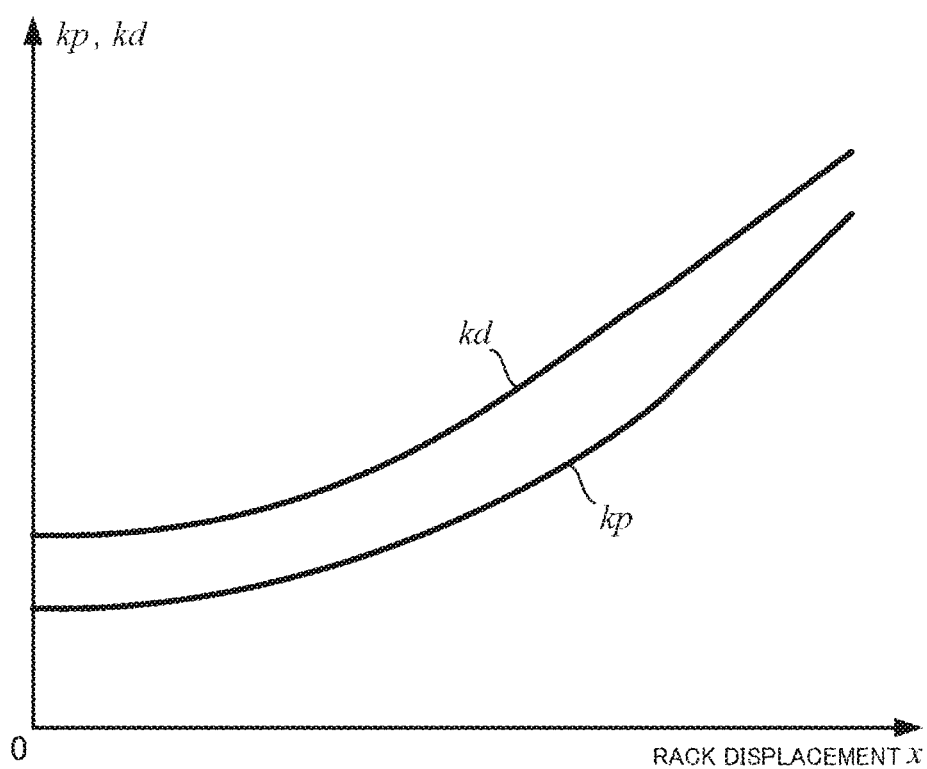
FIG. 21 is a diagram showing an example of changing parameters of a reference model depending on a rack displacement.

The control parameter setting section 127 outputs the proportional gain kp and the differential gain kd having such as characteristics shown in FIG. 21, and the proportional gain kp and the differential gain kd are inputted into the control element section 153. Since the proportional gain kp and the differential gain kd have the characteristics as shown in FIG. 21, the control gain of the control element section 153 is small in the region that rack displacement x is small (i.e. the start steering angle neighborhood), and the larger the rack displacement x is (i.e. as approaching to the rack end), the larger the control gain is.

Figure 22:
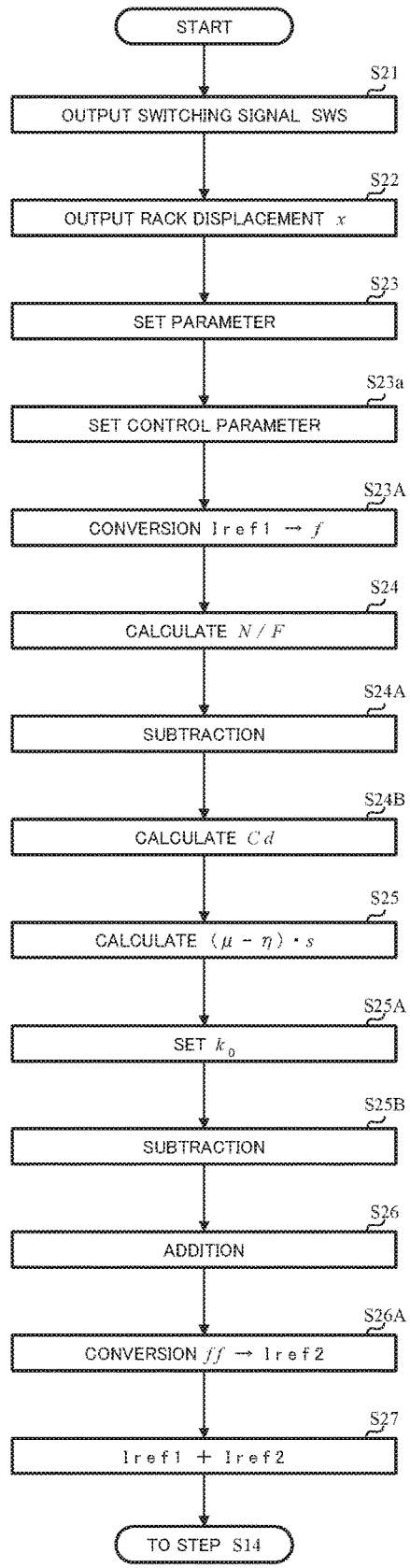
FIG. 22 is a flowchart showing an operation example (the third example) of the viscoelastic model following control section.

In such the configuration, the operation example of the viscoelastic model following control section will be described with reference to flowcharts of FIG. 22. The operation is same with the second example except for the Step S23a.

The switching signal SWS is outputted from the rack end approach judging section 110 (Step S21), and the rack displacement x is outputted (Step S22). The rack displacement x is inputted into the spring constant term 131, the viscous friction coefficient term 132, the parameter setting section 124, the subtracting section 142 and the control parameter setting section 127. The parameter setting section 124 sets the spring constant $k_0$ and the viscous friction coefficient μ obtained in accordance with the characteristics shown in FIG. 16A in the spring constant term 131, the viscous friction coefficient term 132 and the feed-back element (N/F) 141 (Step S23). The control parameter setting section 127 sets the proportional gain kp and the differential gain kd obtained in accordance with the characteristics shown in FIG. 21 in accordance with the rack displacement x in the control element section 153 (Step 23a). Further, the converting section 101 converts the current command value Iref1 to the rack axial force f according to the Equation 1 (Step S32A), and the rack axial force f is inputted into the feed-back element (N/F) 141 and then is N/F-calculated (Step S24). The N/F-calculated value is adding-inputted into the subtracting section 142 and then rack displacement x is subtracted (Step S24A), and the subtracted result is Cd-calculated at the control element section 153 (Step S24B). The calculated rack axial force FB is outputted from the control element section 153 and then is inputted into the contact point b2 of the switching section 122.

The feed-forward control section 130 outputs the rack axial force FF by the operation similar to the Steps S25 to S25B in the second example, and the rack axial force FF is inputted into the contact point b1 of the switching section 121. The calculation order of the feed-forward control section 130 and the feed-back control section 140 is may be alternated.

Thereafter, the same operations at the Steps S26 to S27 in the second example are performed and the step returns to the Step S14.

Next, another example (the fourth example) will be described.

Although the control parameters of the feed-back control section are changed based on the rack displacement in the second example, the control parameters in the fourth example are changed based on the target rack displacement (the target steering angle).

Figure 23:
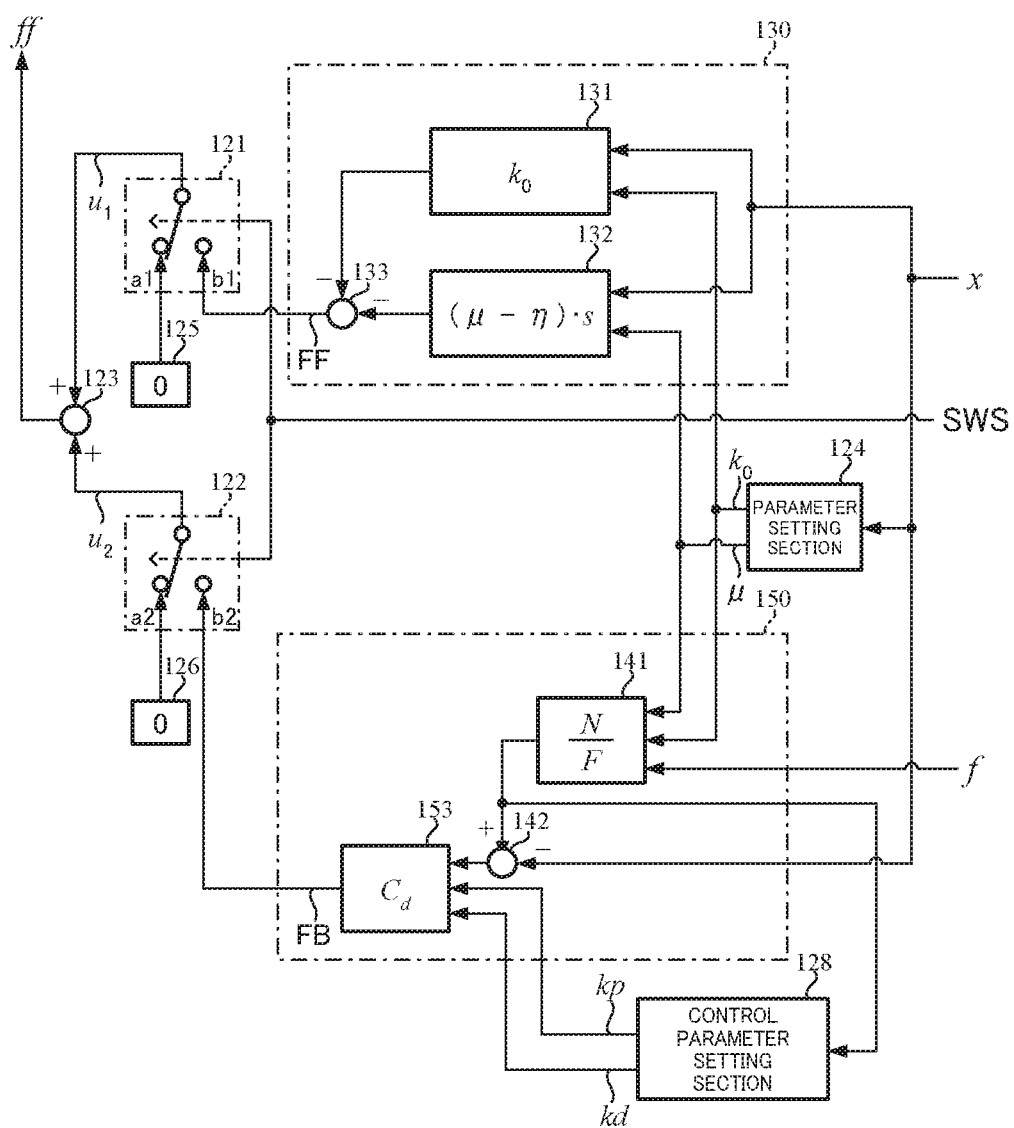
FIG. 23 is a block diagram showing a detailed configuration example (the fourth example) of a viscoelastic model following control section.

FIG. 23 shows the detail configuration example of the viscoelastic model following control section in the fourth example, the input for the control parameter setting section 128 is not the rack displacement x and is different from the third example shown in FIG. 20. In the fourth example, the N/F-calculated value being the target rack displacement from the feed-back element (N/F) 141 is inputted into the control parameter setting section 128. The control parameter setting section 128 outputs the proportional gain kp and the differential gain kd having the same characteristics shown in FIG. 21 in accordance with the target rack displacement. The configuration of the viscoelastic model following control section except for the control parameter setting section 128 is same with the first example and the same operations are performed.

Although the control element section 143 (Cd) (or 153) is a PD-configuration in the above-stated examples (the first example to the fourth example), a PID control or a PI control is applicable. In a case of the PID control, the transfer function is expressed as the following Equation 34. Then, the proportional gain kp, the differential gain kd and the integral gain ki are the control parameters, and the integral gain ki has a characteristic approximating to the proportional gain kp and the differential gain kd.

$$C_d = kp + kd \cdot s + \frac{ki}{s}$$ [Equation 34]

In a case of the PI control, the transfer function is expressed as the following Equation 35.

$$C_d = kp + \frac{ki}{s}$$ [Equation 35]

Further, as the transfer function of the control element section 153 (or 143) in the PD control, a differential time Td by means of the following Equation 36 may use instead of the differential gain kd.

$$Cd = kp(1 + Td \cdot s)$$ [Equation 36]

In this case, the proportional gain kp and the differential time Td are the control parameters. Similarly, it may use an integral time Ti instead of the integral gain ki in the PID control or the PI control.

As well, the example 1 of FIG. 14 also can add the control parameter setting section 127 added in the third example or the control parameter setting section 128 added in the fourth example in the same aspect. Further, the configuration of only the feed-back control section 150 is may be adopted in similar to the first and second examples without the configuration of the feed-forward control section 130 and the feed-back control section 150.

Next, the fifth example will be described.

In the third embodiment shown in FIG. 18, the feed-back control section 140 comprises the feed-back element (N/F) 141 to calculate the target rack displacement (the target steering angle) based on the rack axial force f as the parameters which are the spring constant $k_0$ and the viscous friction coefficient μ, the subtracting section 142 to obtain the position deviation between the target rack displacement and the rack end x, and the control element section 143 including PID, PI and so onto control-processes the rack axial force FB based on the position deviation. The rack axial force FB from the feed-back control section 140, i.e. the output of the control element section 143 is inputted into the contact point b2 of the switching section 122. The fixed value "0" from the fixing section 126 is inputted into the contact point a2 of the switching section 122. Then, the rack axial force f is inputted into the feed-back element 141, and the rack displacement x is subtracting-inputted into the subtracting section 142 in the feed-back control section 140 as well as the parameter setting section 124. The parameter setting section 124 outputs the spring constant $k_0$ and the viscous friction coefficient μ with the characteristics as shown by the real lines of FIG. 24, and the spring constant $k_0$ and the viscous friction coefficient μ are inputted into the feed-back element 141. The contact points a2 and b2 of the switching section 122 are switched by the switching signal SWS from the rack end approach judging section 120. The model parameter of the reference model (the feed-back element 141) or the control parameters of the control element section or the both parameters are changed based on the rack axial force (SAT) f, the rack displacement x and the steering state (steer-forward/steer-back), and the input to the feed-back element 141 of the input-side rack axial force f is limited with the set limiting value (changeable).

That is, there is provided a configuration of the model following control that the reference model is the viscoelastic model within the predetermined angle at the front of the rack end. In addition to that the model parameters of the viscoelastic model and the control parameters (the control gains) are variable within the predetermined angle range, the model parameters and the control parameters are also variable in response to the rack axial force when the rack position enters within the predetermined angle region. For example, the spring term of the viscoelastic model and the control gain are set small near the start steering angle and they are set large as the rack position approaches to the rack end. When the rack position enters within the predetermined angle, the smaller the rack axial force is, the larger the spring term and the control gain are set. Thus, the control variable near the start steering angle can be small and the change amount of the assist amount within and out of the predetermined angle range becomes small. In this way, the driver does not feel uncomfortable for a reaction force due to the change of the assist amount. Since the control gain is set large and the controlled variable is large at a region near the rack end, the shock force can be attenuated when the steering position reaches at the rack end.

Figure 25:
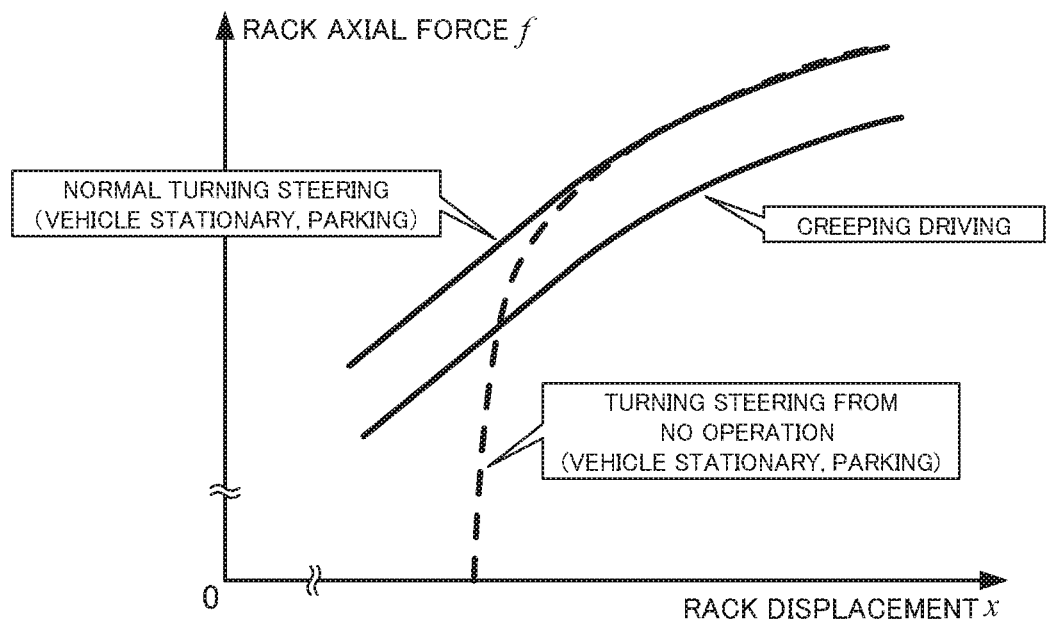
FIG. 25 is a characteristic diagram showing a characteristic example of a reaction force (a rack axial force) in a driving state.

Further, the rack axial force within the predetermined angle region is varied depending on the road surface state (the asphalt, the wet road surface, the ice surface, the snow surface or the like). The rack axial force is small in a case (the ice surface or the snow surface) that a friction coefficient of the road surface is small, and it is large since the surface friction coefficient is large on the asphalt road. As shown in FIG. 25, since the reaction force from the tire at vehicle stationary (parking) is different from that during a driving in the creeping speed, the rack axial force varies. In addition, the load characteristic is also different due to the degree of torsion of the tire. It is desired that the steering angle is controlled at almost constant irrespective of the road surface state and the driving state. In order to accomplish the above desired control, the positive and negative maximum values of the input of the rack axial force to the reference model are limited in the present invention (the fifth to seventh examples). By setting the limiting value to limit the input, the reference model output (the target steering angle) becomes constant and therefore the dispersion of the control effect is suppressed. Further, by adjusting the limiting value depending on the rack axial force, it is possible to adjust the reference model output (the target steering angle) and the dispersion of the effect can further be small.

Furthermore, the reference model and the control parameters are changed in accordance with the steering state (steer-forward/steer-back) in the fifth example. By changing the reference model and the control parameters in accordance with the steering state of the steer-forward maneuver and the steer-back maneuver, it is possible to change a variation of the steering torque which the driver feels. For example, since the driver feels a sense to be returned if the steering torque suddenly becomes small at the steer-back maneuver, the comfort of the driver is impaired. It is capable of preventing the problem by setting the parameters so that the viscosity becomes large at the steer-back maneuver.

Here, the judgment of steer-forward/steer-back is performed so that the steer-forward is determined when the rack displacement x and the rack displacement velocity are same directions (same sign) and the steer-back is determined when they are different direction (different sign). Alternatively, it is possible to judge the steering state with the column shaft angle and the column shaft angle velocity instead of the rack displacement and the rack displacement velocity.

Figure 26:
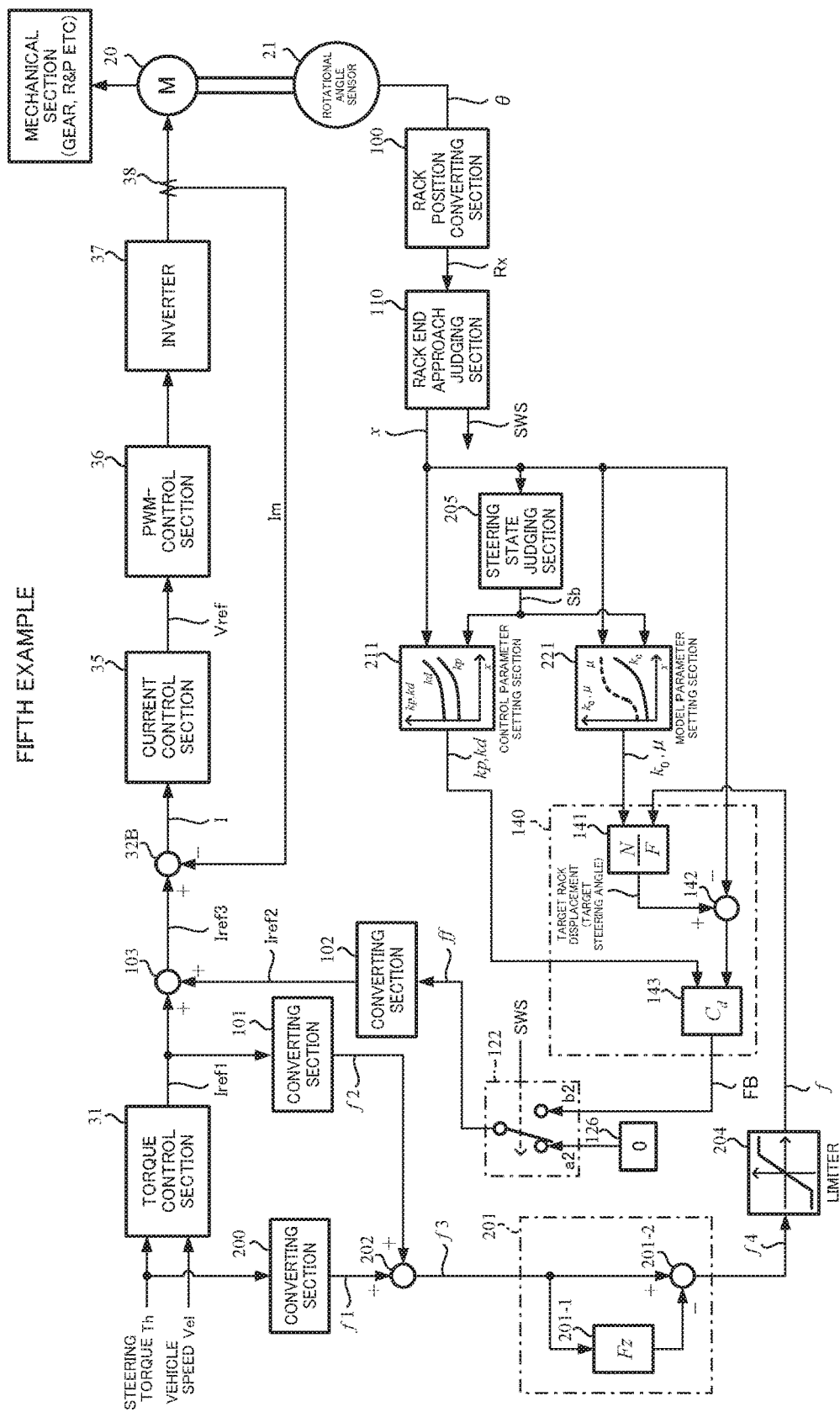
FIG. 26 is a block configuration diagram showing the fifth example of the present invention.

FIG. 26 shows the fifth example corresponding to FIG. 3 and FIG. 14, there are provided the converting section 200 to convert the steering torque Th to the rack axial force f1, the adding section 202 to add the rack axial force f1 and the rack axial force f2 from the converting section 101, the calculating section 201 to calculate the rack axial force f4 from the rack axial force f3 (=f1+f2) obtained at the adding section 202, the limiter to output the input-side rack axial force f by limiting the maximum value of the rack axial force f4 from the calculating section 201, the control parameter setting section 211 to set the control parameters for the control system, and the model parameter setting section 221 to set the model parameters for the model system.

Further, there is provided the steering state judging section 205 that inputs the rack displacement x (or the judging rack position Rx), calculates the rack displacement velocity, judges the steering state (steer-forward/steer-back) due to the directions (positive and negative) of the rack displacement x and the rack displacement velocity and outputs the judgment result. The judgment result for the steering state is inputted into the control parameter setting section 211 and the model parameter setting section 221.

The axial force calculating section 201 to input the rack axial force f3 (=f1+f2) comprises a setting storing section 201-1 to set and store the rack axial force f3 when the rack displacement x becomes within the predetermined angle range as an initial rack axial force Fz, and a subtracting section 201-2 to output the input-side rack axial force f obtained by subtracting the initial rack axial force Fz from the rack axial force f3 hereinafter. The initial rack axial force Fz is a rack axial force when the rack displacement x is within the predetermined angle range. The axial force calculating section 201 calculates the rack axial force f4 based on the below Equation 37 after the rack displacement x is within the predetermined angle region. This reason is that the output of the reference model is "0" at the predetermined angle and the rack axial force FB outputted from the control element section 143 is "0". The processing is in order to eliminate the steps of the command value at the steering near the predetermined angle and to easily realize the steering holding.

$$f4=(f1+f2)-Fz \qquad \text{[Equation 37]}$$

Figure 27:
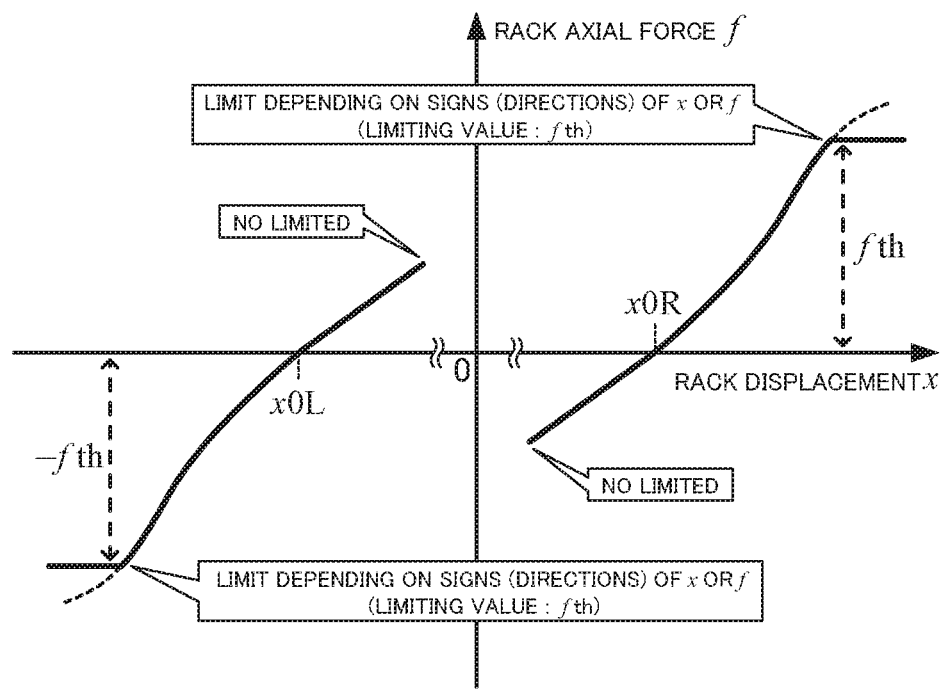
FIG. 27 is a characteristic diagram showing a characteristic example of a limiter.

The limiter 204 limits the positive and negative maximum values with the characteristic as shown in FIG. 27, and the input-side rack axial force f whose maximum value is limited is inputted into the feed-back element 141 in the feed-back control section 140. In FIG. 27, "x0R" and "x0L" are the angle which sets the predetermined angle region.

Figure 28:
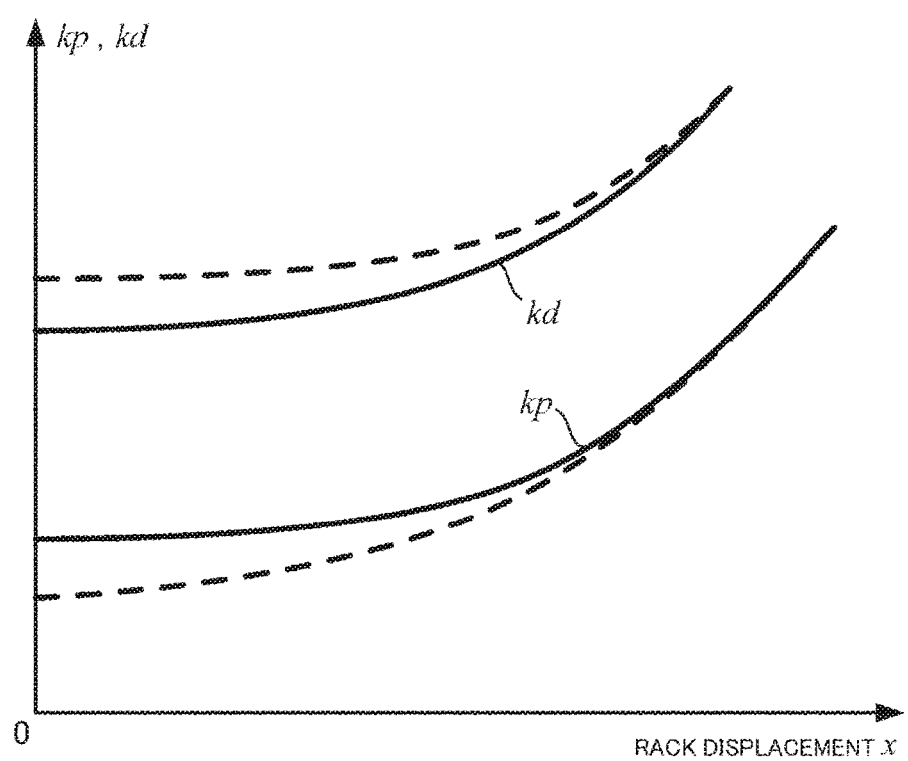
FIG. 28 is a characteristic diagram showing a characteristic example of a control parameter setting section.

Further, the control parameter setting section 211 of the control system inputs the rack displacement x and outputs the control parameters kd and kp with a nonlinear relationship that the gradient rate of the increasing is larger as the rack displacement x is larger, for example, as shown by real lines of FIG. 28. The control parameters kd and kp are set by using the below Equation 38 at the control element section 143 in the feed-back control section 140.

$$Cd=kp+kd\cdot s \qquad \text{[Equation 38]}$$

Figure 24:
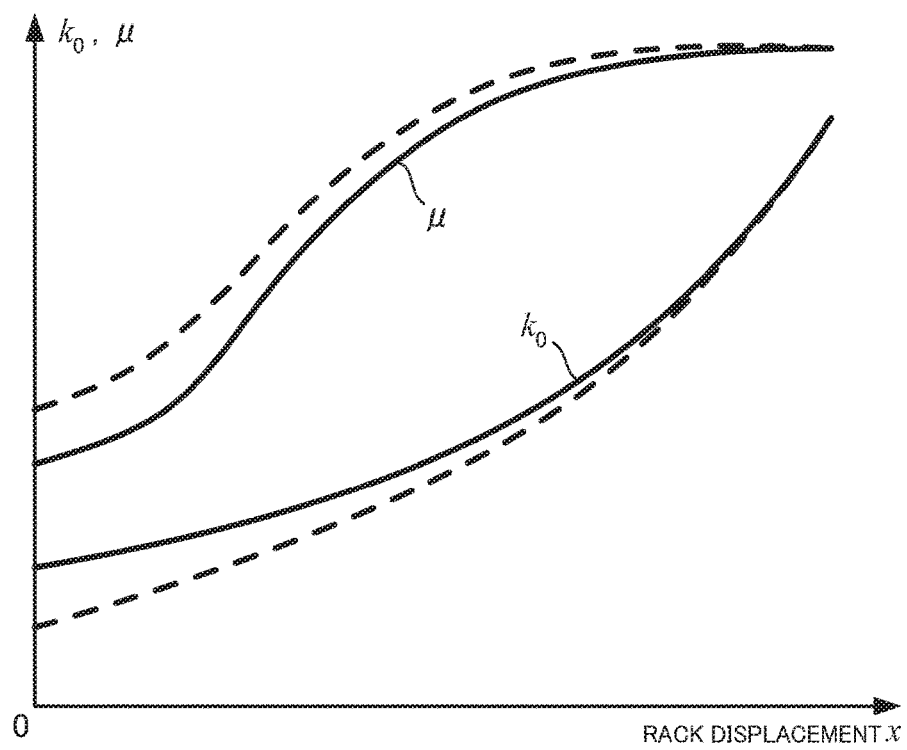
FIG. 24 is a diagram showing an example of changing parameters of a reference model depending on a rack position.

The model parameter setting section 221 of the model system inputs the rack displacement x and outputs the model parameters $\mu$ (the viscous friction coefficient) and $k_0$ (the spring constant) with the characteristics, for example, as shown by real lines of FIG. 24. The model parameters $\mu$ and $k_0$ are set at the feed-back element (N/F) 141 in the feed-back control section 140.

In the fifth example, the steering state judging section 205 judges the steer-forward or steer-back of the steering maneuver, and the judgment result Sb is inputted into the control parameter setting section 211 and the model parameter setting section 221. The model parameter setting section 221 changes the model parameters $\mu$ and $k_0$ between the real line and the dotted line of FIG. 24 corresponding to the steer-forward or steer-back of the steering state. Further, the control parameter setting section 211 changes the control parameters kd and kp between the real line and the dotted line of FIG. 28 corresponding to the steer-forward or steer-back of the steering state.

Figure 29:
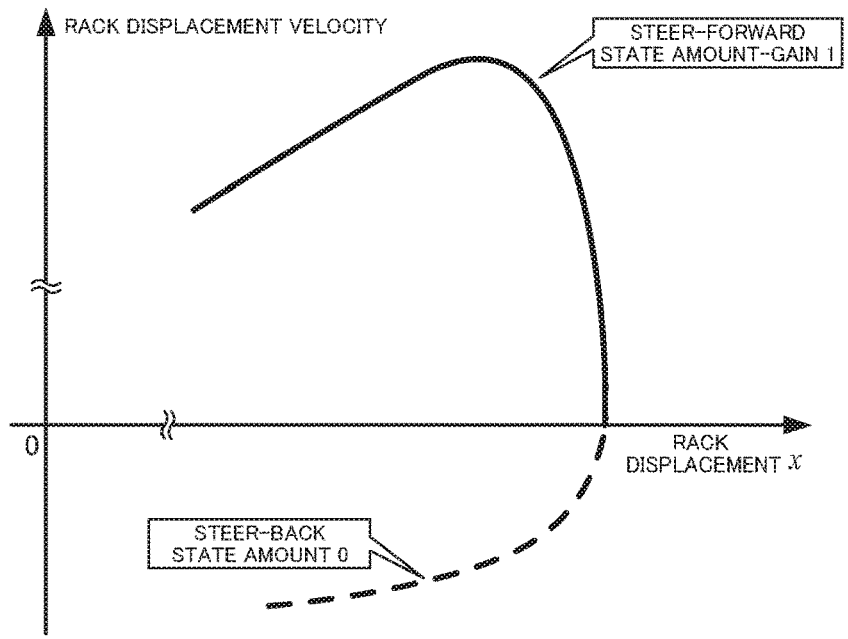
FIG. 29 is a characteristic diagram showing an example of a switching pattern of a steer-forward/steer-backward.
Figure 30:
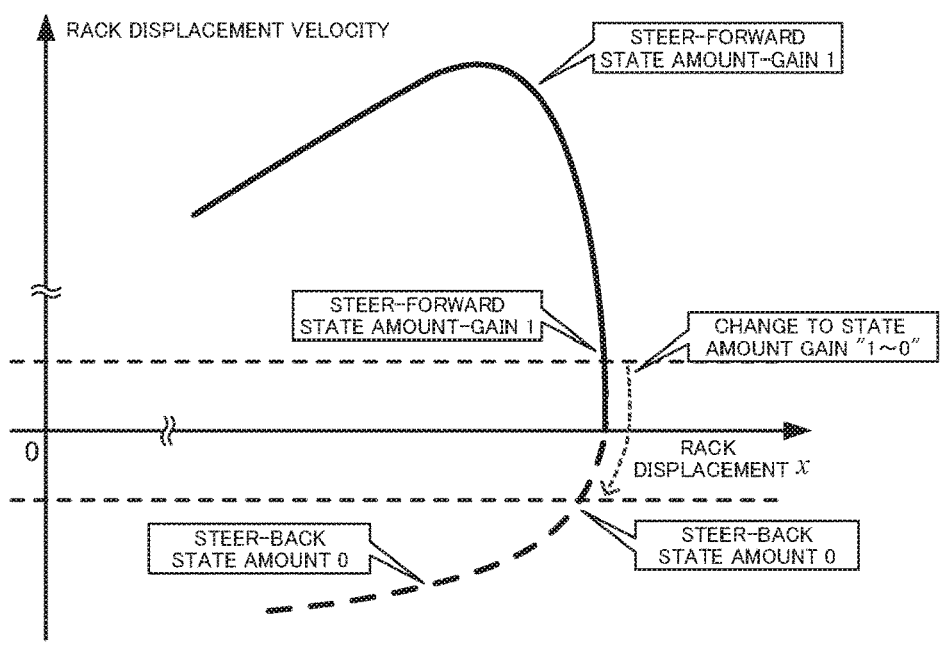
FIG. 30 is a characteristic diagram showing another example of the switching pattern of the steer-forward/steer-backward.

At the switching time, the control parameter setting section 211 the model parameter setting section 221 gradually switches from the steer-forward parameters to the steer-back parameters as shown in FIG. 29 when the turning state amount "1" is varied to the returning state amount "0", and the switching operation is completed within a predetermined time. Or, as shown in FIG. 30, it is also possible to set a predetermined region in the rack displacement velocity and allocate a state amount gain a, and to obtain final parameters by performing the calculation of the following Equation 39.

$$\text{final parameters=steer-forward parameters} \times \alpha + \text{steer-back parameters} \times (1-\alpha) \qquad \text{[Equation 39]}$$

Figure 31:
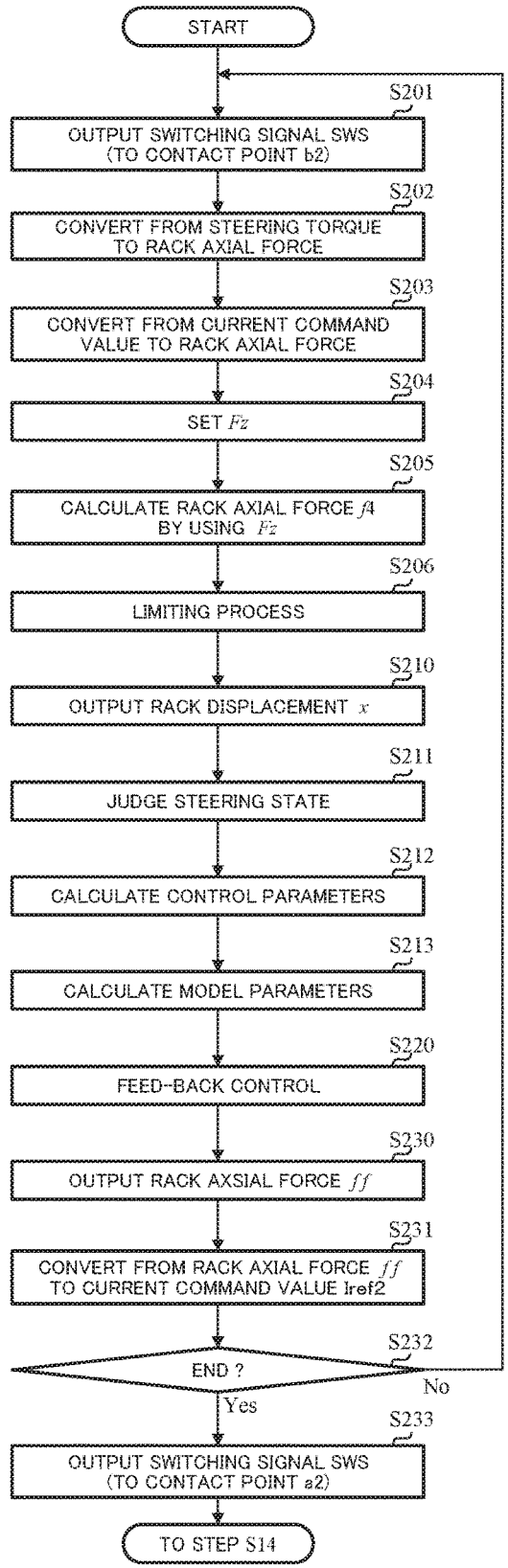
FIG. 31 is a flowchart showing an operation example of the fifth example according to the present invention.

In such a configuration, the operation example of the fifth example of FIG. 26 will be described with reference to flowcharts of FIG. 31 and FIG. 32.

The switching signal SWS is outputted from the rack end approach judging section 110, the contacts of the switching section 122 are switched from the contact point a2 to the contact point b2 (Step S201), and the steering torque Th is converted to the rack axial force f1 in the converting section 200 (Step S202). The current command value Iref1 is calculated in the torque control section 31 and is converted to the rack axial force f2 in the converting section 101 (Step S203). The rack axial force f3 just when the switching section 122 is switched to the contact point b2 is set in the setting storing section 201-1 as the initial rack axial force Fz (Step S204). Thereafter, the rack axial force f4 is calculated by subtracting the stored initial rack axial force Fz from the rack axial force f3 in the subtracting section 201-2 (Step S205), and the calculated rack axial force f4 is limiting-processed in the limiter 204 (Step S206). The limiting-processed rack axial force is inputted into the feed-back element 141 of the feed-back control section 140 as the input-side rack axial force f.

Further, the rack displacement x is outputted from the rack end approach judging section 110 (Step S210), the rack displacement x is inputted into the steering state judging section 205 and the steering state is judged (Step S211). The judgment result Sb is inputted into the control parameter setting section 211 and the model parameter setting section 221.

Furthermore, the rack displacement x is subtracting-inputted into the subtracting section 142 in the feed-back control section 140 as well as to the control parameter setting section 211 and the model parameter setting section 221. The control parameter setting section 211 calculates the control parameters kp and kd based on the rack displacement x and the judgment result Sb (Step S212), and the control parameters kp and kd are set in the control element section 143 of the feed-back control section 140. The model parameter setting section 221 calculates the model parameters μ and $k_0$ based on the rack displacement x and the judgment result Sb (Step S213), and the model parameters μ and $k_0$ are set in the feed-back element 141 of the feed-back control section 140.

The feed-back control section 140 performs the feed-back control by using the rack axial force f, the rack displacement x, the control parameters kp and kd, and the model parameters p and $k_0$ (Step S220), and outputs the output-side rack axial force ff (Step S230). The rack axial force ff is converted to the current command value Iref2 in the converting section 102 (Step S231), and this process is repeated to the end (Step S232).

Figure 7:
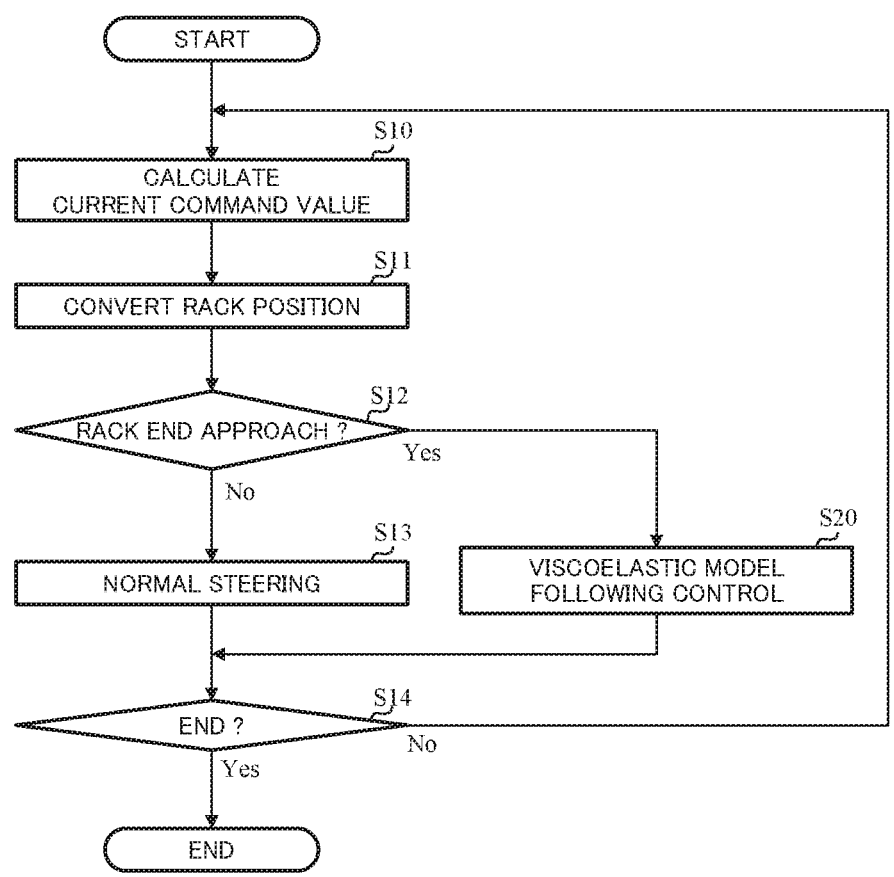
FIG. 7 is a flowchart showing an operation example (overall) of the present invention.
Figure 8:
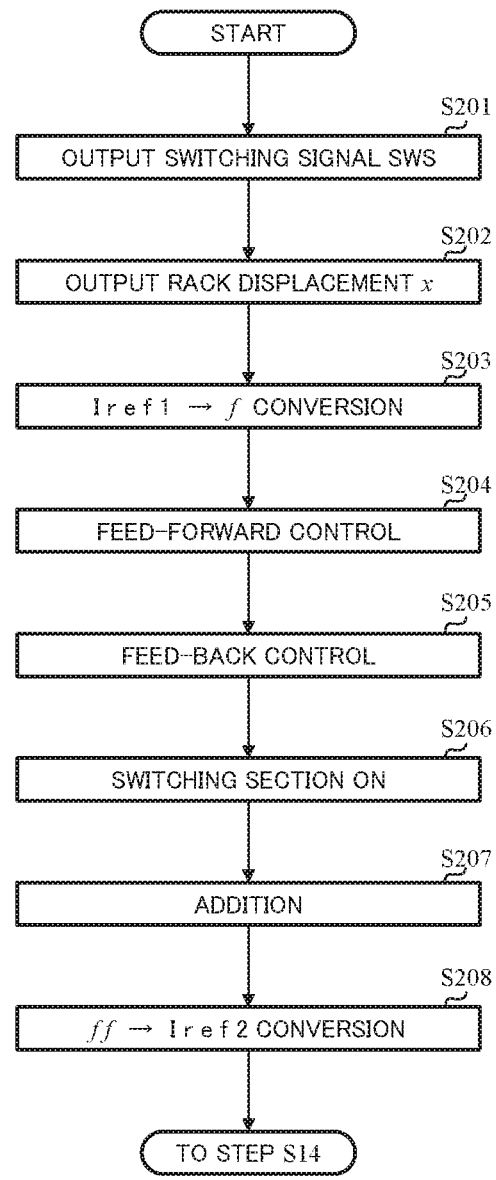
FIG. 8 is a flowchart showing an operation example of the viscoelastic model following control section.

When the process is ended in the Step S232, the contacts of the switching section 122 are switched from the contact point b2 to the contact point a2 by the output of the switching signal SWS (Step S233), and then the process is proceeded to the above Step S14 of FIG. 7.

Figure 32:
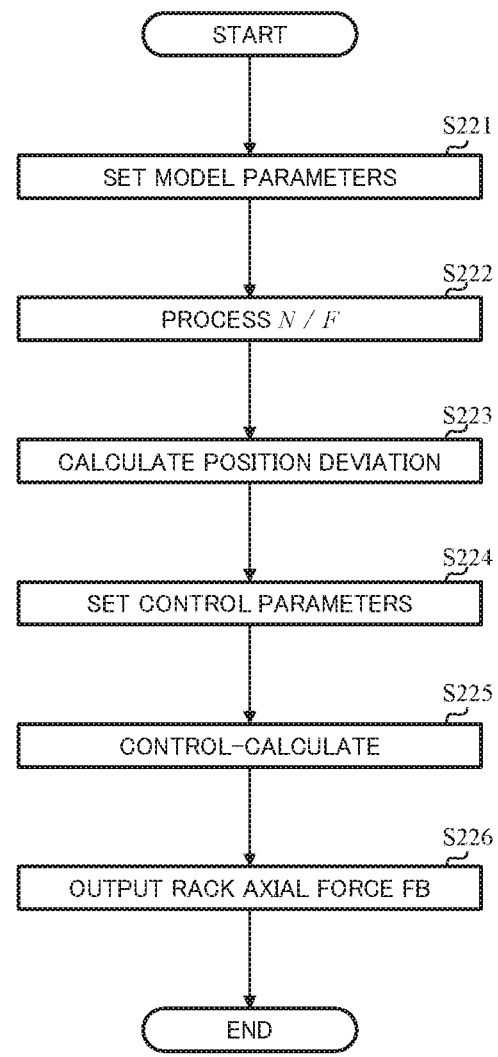
FIG. 32 is a flowchart showing an operation example of a feed-back control.

The process of the feed-back control in the feed-back control section 140 is performed with the operation as shown in FIG. 32.

First, the model parameters μ and $k_0$ calculated in the model parameter setting section 221 are set in the feed-back element 141 (Step S221), the N/F-process is performed in the feed-back element 141, and the target rack displacement (the target steering angle) is calculated (Step S222). The target rack displacement is adding-inputted into the subtracting section 142, the position deviation is calculated by subtracting the subtracting-inputted rack displacement x from the target rack displacement (Step S223), and the calculated position deviation is inputted into the control element section 143. Further, the control parameters kp and kd calculated in the control parameter setting section 211 are set in the control element section 143 (Step S224), a control calculation is performed (Step S225), and the control-cal-culated rack axial force FB is outputted (Step S226). As well, the setting order of the control parameters kp and kd is alternative.

Figure 33:
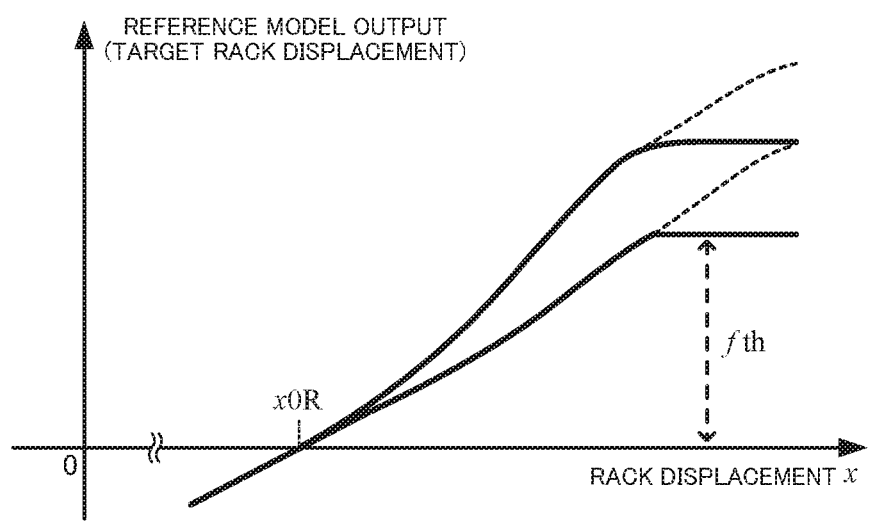
FIG. 33 is a characteristic diagram explaining an effect due to an input limitation.

Since the output of the input-side rack axial force f is limited by the limiter 204 in the fifth example, a reference model output is saturated as shown by the real line in FIG. 33. If the output of the input-side rack axial force f is not limited, the reference model output continuously increases without saturation as shown by the dotted lines.

Although the steering state is judged based on the rack displacement x and the rack displacement velocity, it may judge the steering state by using the column shaft angle and the column shaft angle velocity (the sixth example).

Further, although the third embodiment not including the feed-forward control section as the configuration of the model following control is explained in the above fifth and sixth examples, it is possible to similarly apply to the first and second embodiments of which configurations are the feed-back control section and the feed-forward control section. In that case, the parameters of the feed-forward control section are may changed or switched in accordance with the rack displacement x and the judgment result Sb of the steering state.

Figure 34:
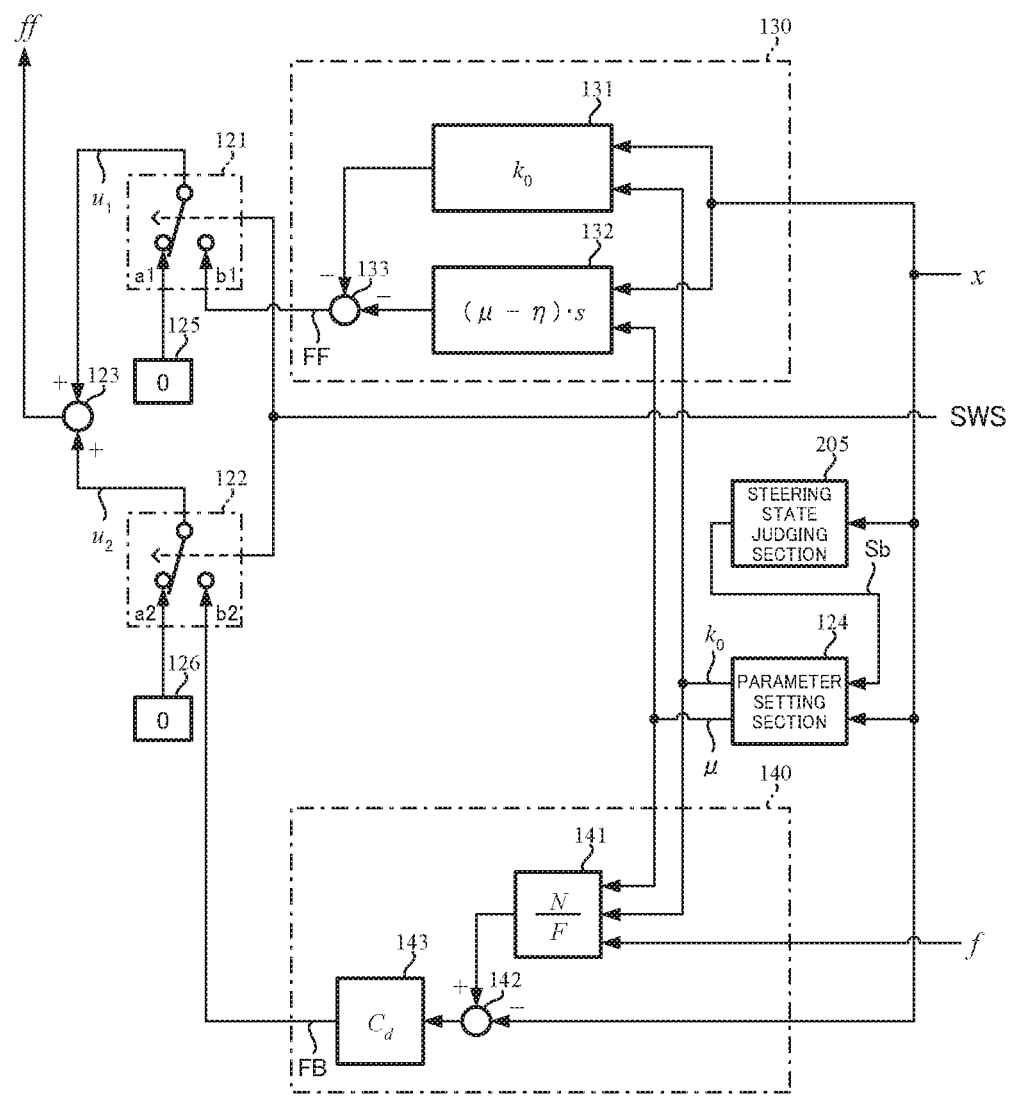
FIG. 34 is a block configuration diagram showing the fifth example of the present invention.

The configuration example of this case will be described with reference to FIG. 34.

The rack displacement x is inputted into the spring constant term 131 and the viscous friction coefficient term 132 in the feed-forward control section 130, the subtracting section 142 in the feed-back control section 140, the parameter setting section 124 and the steering state judging section 205. The rack axial force f is inputted into the feed-back element (N/F) 141 in the feed-back control section 140. The parameter setting section 124 outputs the spring constant $k_0$ and the viscous friction coefficient μ corresponding to the rack displacement x and the judgment result Sb of the steering judging section 205, the spring constant $k_0$ is inputted into the spring constant term 131 and the feed-back element (N/F) 141, and the viscous friction coefficient μ is inputted into the viscous friction coefficient term 132 and the feed-back element (N/F) 141. Further, the switching signal SWS is inputted into the switching sections 121 and 122, the contact points are normally connected to the contact points a1 and a2, and they are switched to the contact points b1 and b2 due to the switching signal SWS.

The control element section 143 (Cd) may be any of PID (Proportional-Integral-Differential) control, PI control, or PD control. Although the position correcting section is distinguished from the parameter setting section in the above examples, the both sections may be integrated with one body. Further, although the rotational angle θ is obtained from the rotational sensor which is coupled to the motor in the above examples, the rotational angle θ may be obtained from the steering angle sensor.

EXPLANATION OF REFERENCE NUMERALS 1 handle
2 column shaft (steering shaft, handle shaft)
10 torque sensor
12 vehicle speed sensor
13 battery
14 steering angle sensor
20 motor
23 motor driving section
30 control unit (ECU)
31 torque control section
35 current control section 36 PWM-control section
100 rack position converting section
110 rack end approach judging section
120 viscoelastic model following control section
121, 122 switching section
130 feed-forward control section
140 feed-back control section

The invention claimed is:

1. An electric power steering apparatus that calculates a first current command value based on at least a steering torque and performs an assist-control of a steering system by driving a motor based on said first current command value, comprising:
  a first converting section to convert said first current command value to a first rack axial force;
  a rack position converting section to convert a rotational angle of said motor to a judgment rack position;
  a rack end approach judging section to judge that a steering approaches to a rack end based on said judgment rack position and to output a rack displacement and a switching signal;
  a viscoelastic model following control section to generate a second rack axial force including a viscoelastic model as a reference model based on said first rack axial force, said rack displacement and said switching signal; and
  a second converting section to convert said second rack axial force to a second current command value;
  wherein said viscoelastic model following control section comprising:
  a feed-forward control section to feed-forward control based on said first rack axial force and to output a third rack axial force;
  a feed-back control section to feed-back control based on said rack displacement and said first rack axial force and to output a fourth rack axial force;
  a first switching section to switch-ON/OFF an output of said third rack axial force by said switching signal;
  a second switching section to switch-ON/OFF an output of said fourth rack axial force by said switching signal; and
  an adding section to output said second rack axial force by adding outputs of said first and second switching sections;
  wherein said assist-control is performed by adding said second current command value to said first current command value so as to suppress a rack end hitting.

2. The electric power steering apparatus according to claim 1, wherein parameters of said feed-back control section and said feed-forward control section are changed based on said rack displacement.

3. The electric power steering apparatus according to claim 1, wherein said first rack axial force, said second rack axial force, said third rack axial force and said fourth rack axial force are respectively equivalent to a first column shaft torque, a second column shaft torque, a third column shaft torque and a fourth column shaft torque.

4. An electric power steering apparatus that calculates a first current command value based on at least a steering torque and performs an assist-control of a steering system by driving a motor based on said first current command value, comprising:
  a first converting section to convert said first current command value to a first rack axial force;
  a rack position converting section to convert a rotational angle of said motor to a judgment rack position;
  a rack end approach judging section to judge that a steering approaches to a rack end based on said judgment rack position and to output a rack displacement and a switching signal;
  a viscoelastic model following control section to generate a second rack axial force including a viscoelastic model as a reference model based on said first rack axial force, said rack displacement and said switching signal; and
  a second converting section to convert said second rack axial force to a second current command value;
  wherein said viscoelastic model following control section comprising:
  a feed-forward control section to feed-forward control based on said rack displacement and to output a third rack axial force;
  a feed-back control section to feed-back control based on said rack displacement and said first rack axial force and to output a fourth rack axial force;
  a first switching section to switch-ON/OFF an output of said third rack axial force by said switching signal;
  a second switching section to switch-ON/OFF an output of said fourth rack axial force by said switching signal; and
  an adding section to output said second rack axial force by adding outputs of said first and second switching sections;
  wherein said assist-control is performed by adding said second current command value to said first current command value so as to suppress a rack end hitting.

5. The electric power steering apparatus according to claim 4, wherein parameters of said feed-back control section and said feed-forward control section are changed based on said rack displacement.

6. The electric power steering apparatus according to claim 4, wherein said first rack axial force, said second rack axial force, said third rack axial force and said fourth rack axial force are respectively equivalent to a first column shaft torque, a second column shaft torque, a third column shaft torque and a fourth column shaft torque.

7. An electric power steering apparatus that calculates a first current command value based on at least a steering torque and performs an assist-control of a steering system by driving a motor based on said first current command value, comprising:
  a first converting section to convert said first current command value to a first rack axial force;
  a rack position converting section to convert a rotational angle of said motor to a judgment rack position;
  a rack end approach judging section to judge that a steering approaches to a rack end based on said judgment rack position and to output a rack displacement and a switching signal;
  a viscoelastic model following control section to generate a second rack axial force including a viscoelastic model as a reference model based on said first rack axial force, said rack displacement and said switching signal; and
  a second converting section to convert said second rack axial force to a second current command value;
  wherein said viscoelastic model following control section comprising:
  a feed-back control section to feed-back control based on said rack displacement and said first rack axial force and to output a second rack axial force, and
  a switching section to switch-ON/OFF an output of said second rack axial force by said switching signal, wherein control parameters of said feed-back control section are changed based on said rack displacement or a target rack displacement, wherein said assist-control is performed by adding said second current command value to said first current command value so as to suppress a rack end hitting.

8. The electric power steering apparatus according to claim 7, wherein said control parameter is changed so that said control parameter is small where said rack displacement or said target rack displacement is small, and a larger said rack displacement or said target rack displacement, a larger said control parameter.

9. The electric power steering apparatus according to claim 7, wherein parameters of said reference model are changed based on said rack displacement.

10. The electric power steering apparatus according to claim 7, wherein said first rack axial force and said second rack axial force are respectively equivalent to a first column shaft torque and a second column shaft torque.

11. The electric power steering apparatus according to claim 8, wherein parameters of said reference model are changed based on said rack displacement.

12. An electric power steering apparatus that calculates a current command value based on at least a steering torque and performs an assist-control of a steering system by driving a motor based on said current command value, comprising:

a configuration of a model following control comprising a feed-back control section including a viscoelastic model as a reference model within a predetermined angle ($x_0$) at front of a rack end;

wherein said feed-back control section comprises a feed-back element to calculate a target rack displacement based on an input-side rack axial force (f), and a control element section to output an output-side rack axial force (ff) based on a positional deviation between said target rack displacement and a rack displacement (x);

wherein said electric power steering apparatus further comprising:

a correcting section to change parameters of at least one-side of said feed-back control section and said control element section and set corrected parameters;

an axial force calculating section to calculate a rack axial force (f4) based on said steering torque and said current command value;

a limiter to limit a maximum value of said rack axial force (f4) with a limiting value and to output said input-side rack axial force (f); and a steering state judging section to judge a steering state;

wherein said parameters of said feed-forward control section are changed or switched in accordance with said rack displacement (x) and a judgment result of said steering state judging section.

13. The electric power steering apparatus according to claim 12, wherein said model following control further including a feed-forward control section, and parameters of said feed-forward control section are changed or switched according to said rack displacement (x) and a judgment result of said steering state judging section.

14. The electric power steering apparatus according to claim 12, wherein said steering state judging section judges a steer-forward/steer-back based on said rack displacement (x) and a rack displacement velocity.

15. The electric power steering apparatus according to claim 13, wherein said steering state judging section judges a steer-forward/steer-back based on said rack displacement (x) and a rack displacement velocity.

16. The electric power steering apparatus according to claim 12, wherein said steering state judging section judges a steer-forward/steer-back based on a column axial angle and a column axial angle velocity.

17. The electric power steering apparatus according to claim 13, wherein said steering state judging section judges a steer-forward/steer-back based on a column axial angle and a column axial angle velocity.

18. The electric power steering apparatus according to claim 14, wherein said change or switching of said parameters are gradually performed according to a judgment result of said steer-forward/steer-back.

19. The electric power steering apparatus according to claim 18, wherein a state amount of a state of said turning/returning is calculated as a state amount gain 0 to 1, and a final parameter is calculated by weighting said state amount gain for said parameter of said steer-forward/steer-back.

20. The electric power steering apparatus according to claim 19, wherein said state amount gain is a, and said final parameter is calculated by said steer-forward parameter×α+ said steer-back parameter×(1−α).

* * * * *